Feb. 13, 1945.   J. BALTON   2,369,205
JACKET FORMING MACHINE
Filed Feb. 19, 1941   21 Sheets-Sheet 3
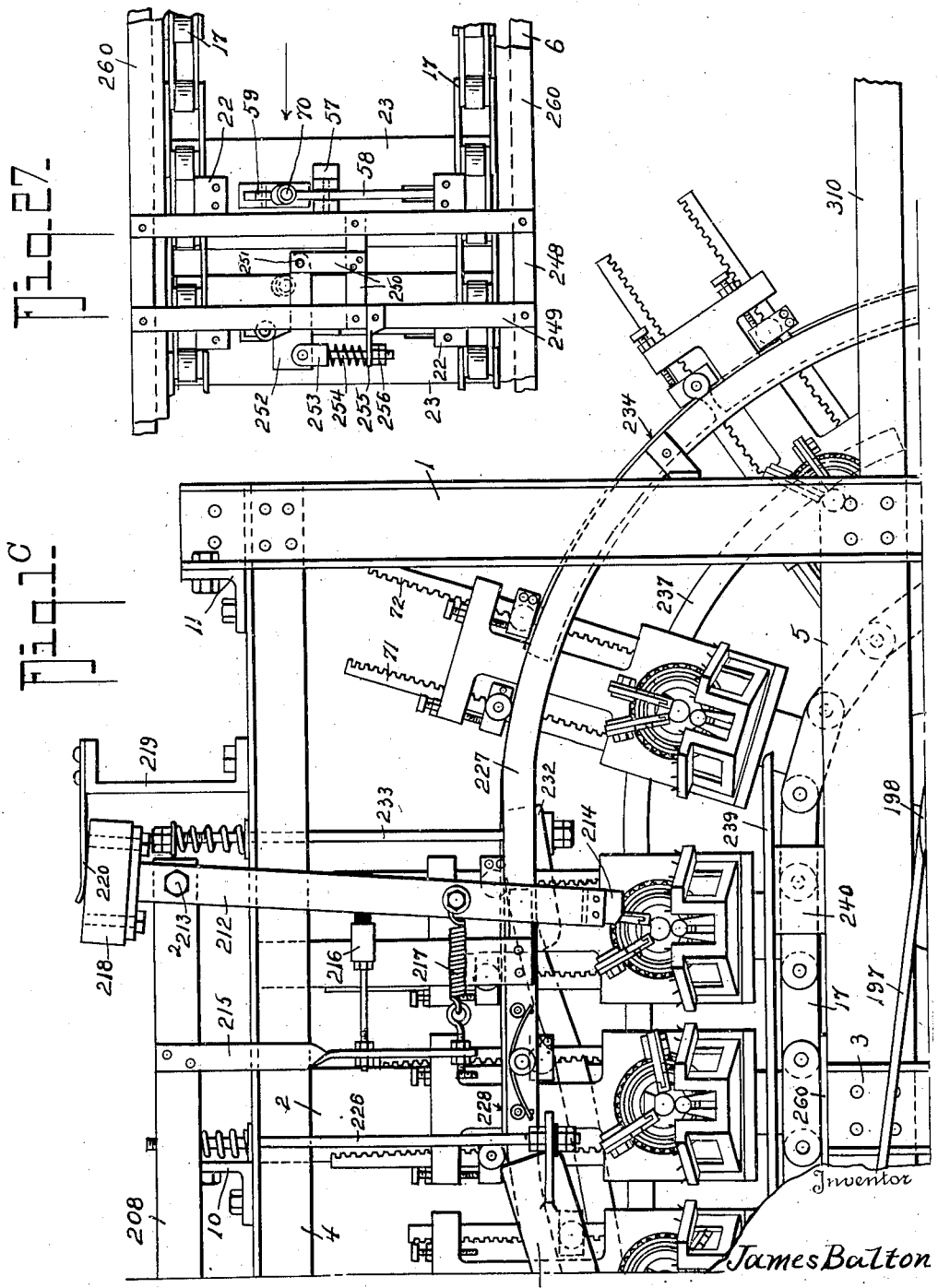

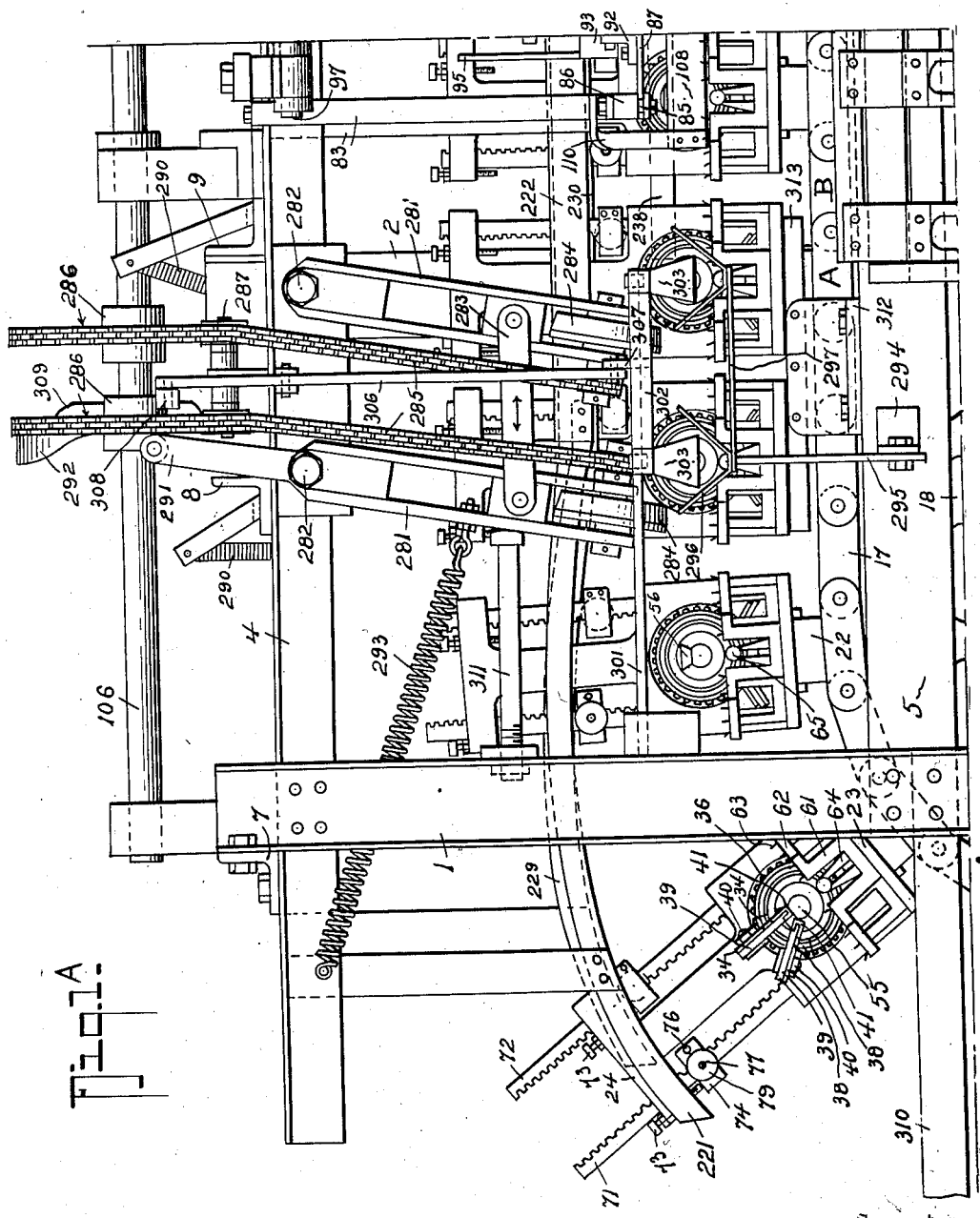

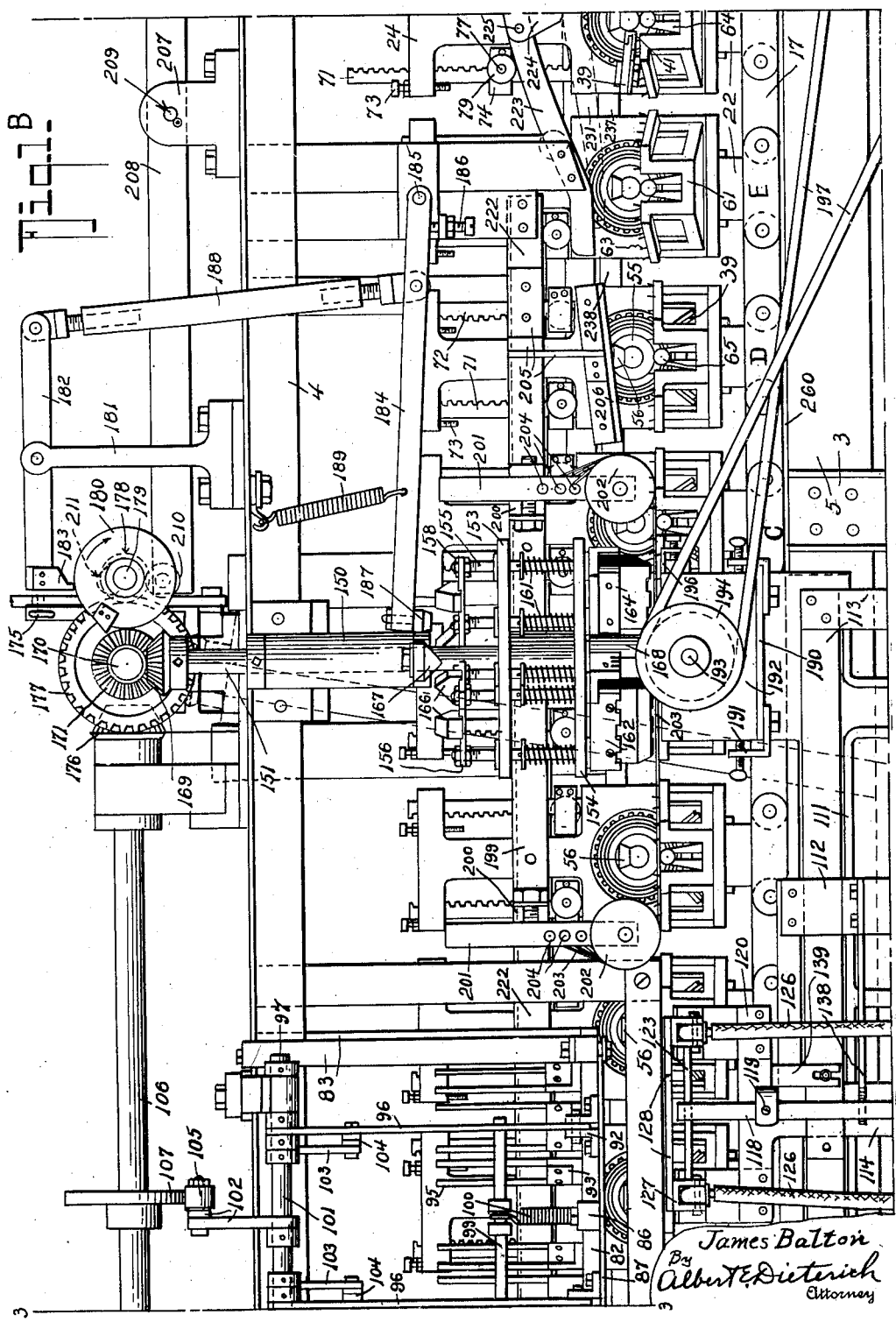

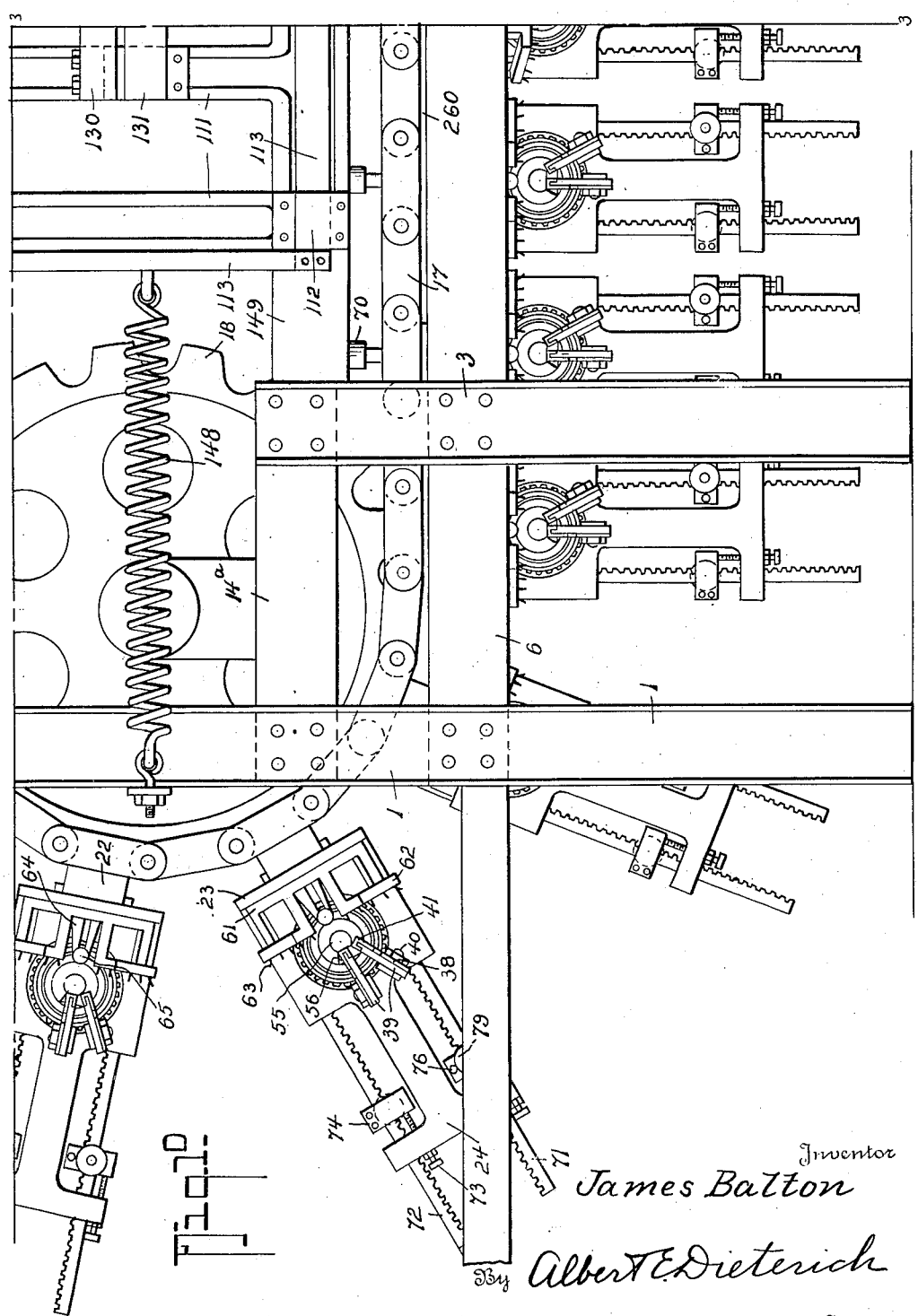

Feb. 13, 1945.    J. BALTON    2,369,205
JACKET FORMING MACHINE
Filed Feb. 19, 1941    21 Sheets-Sheet 5
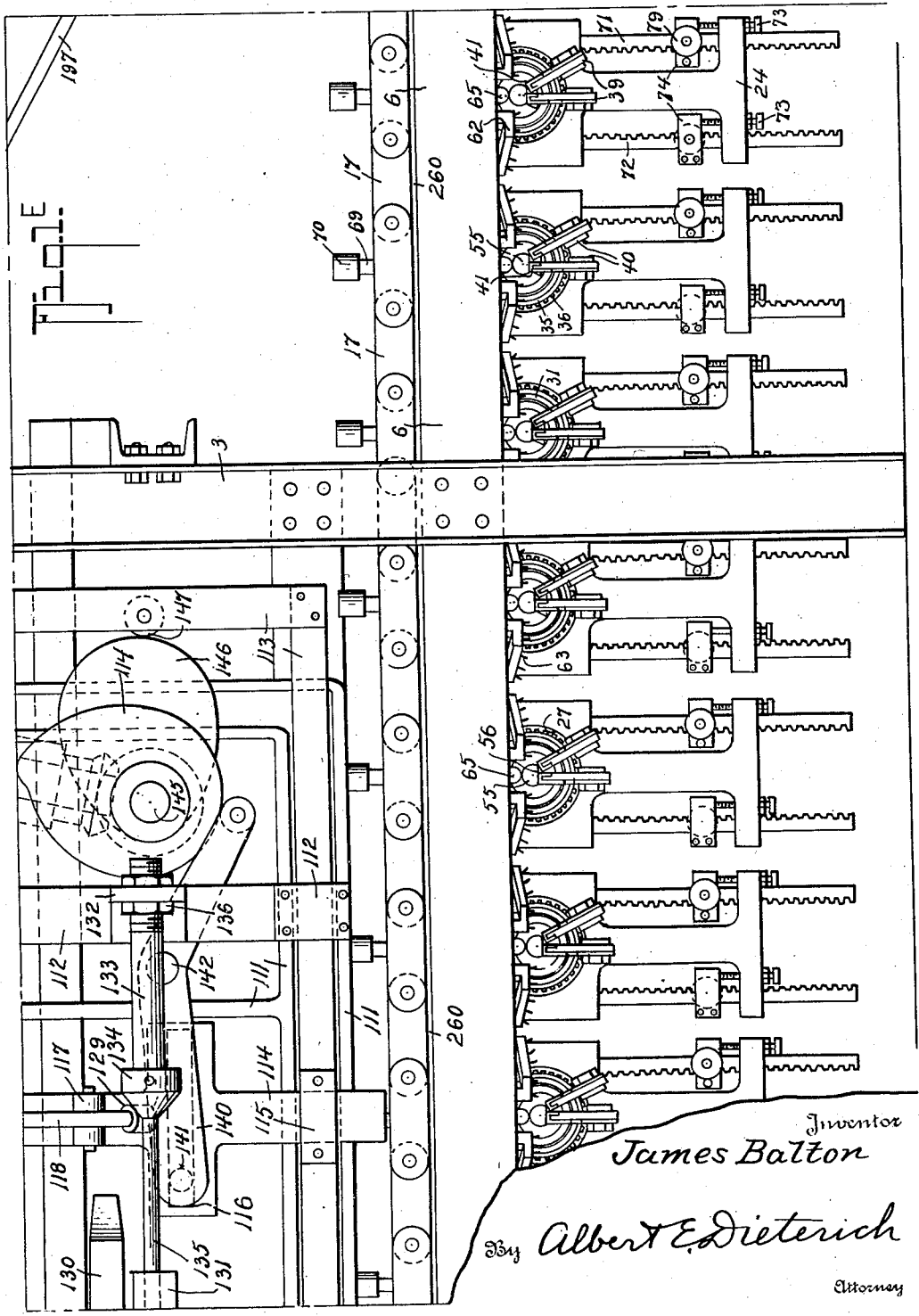
Inventor
James Balton
By Albert E. Dieterich
Attorney

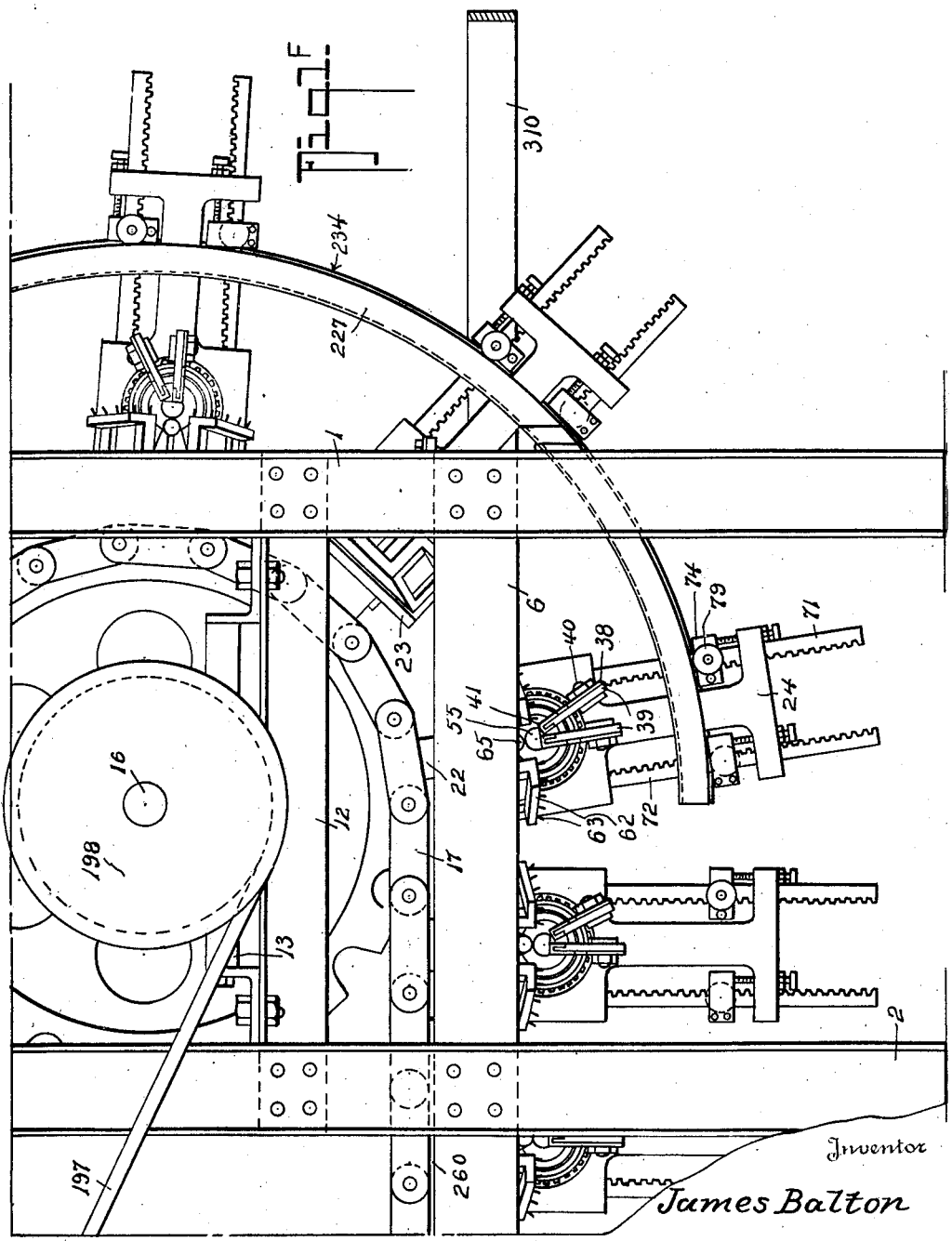

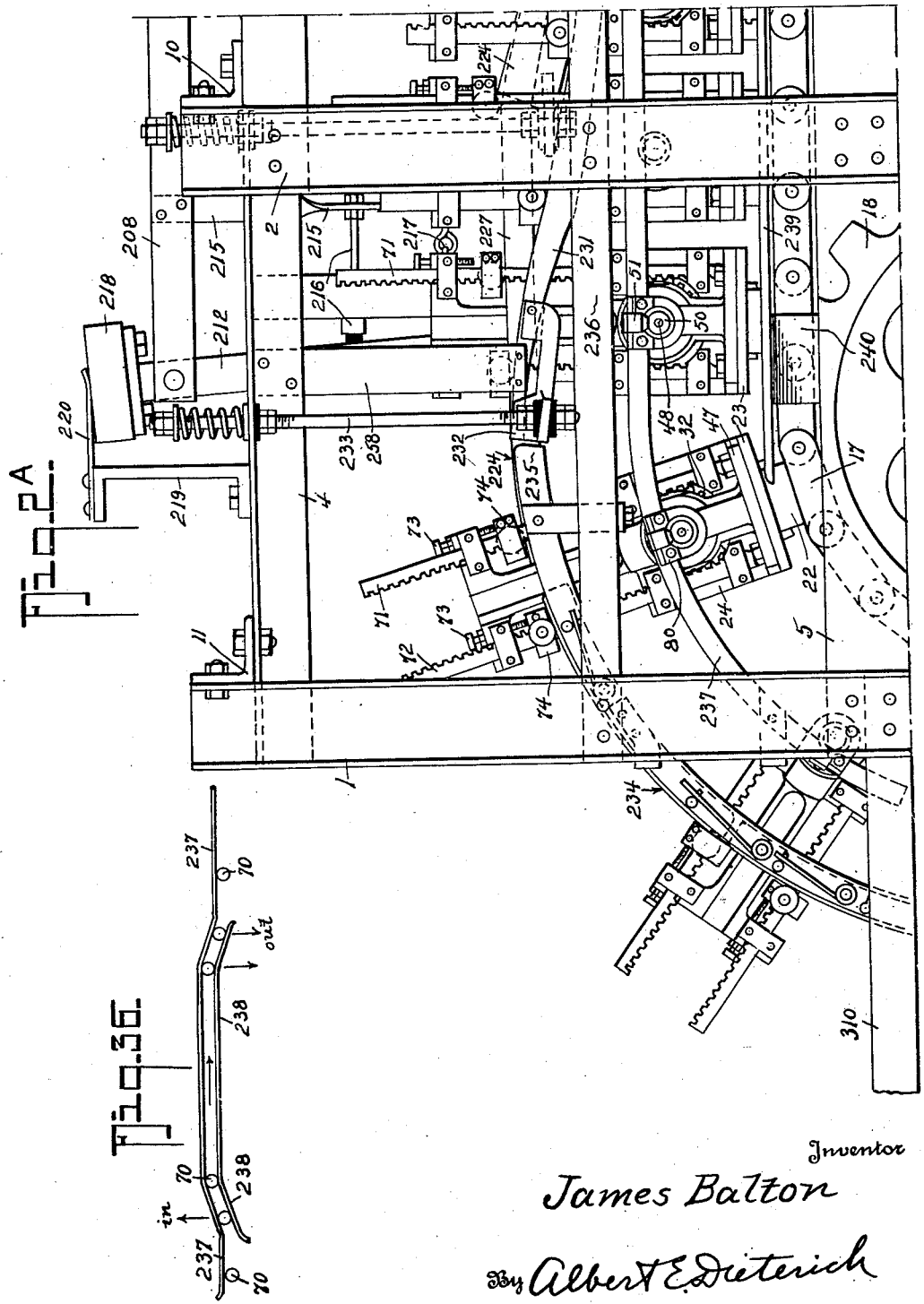

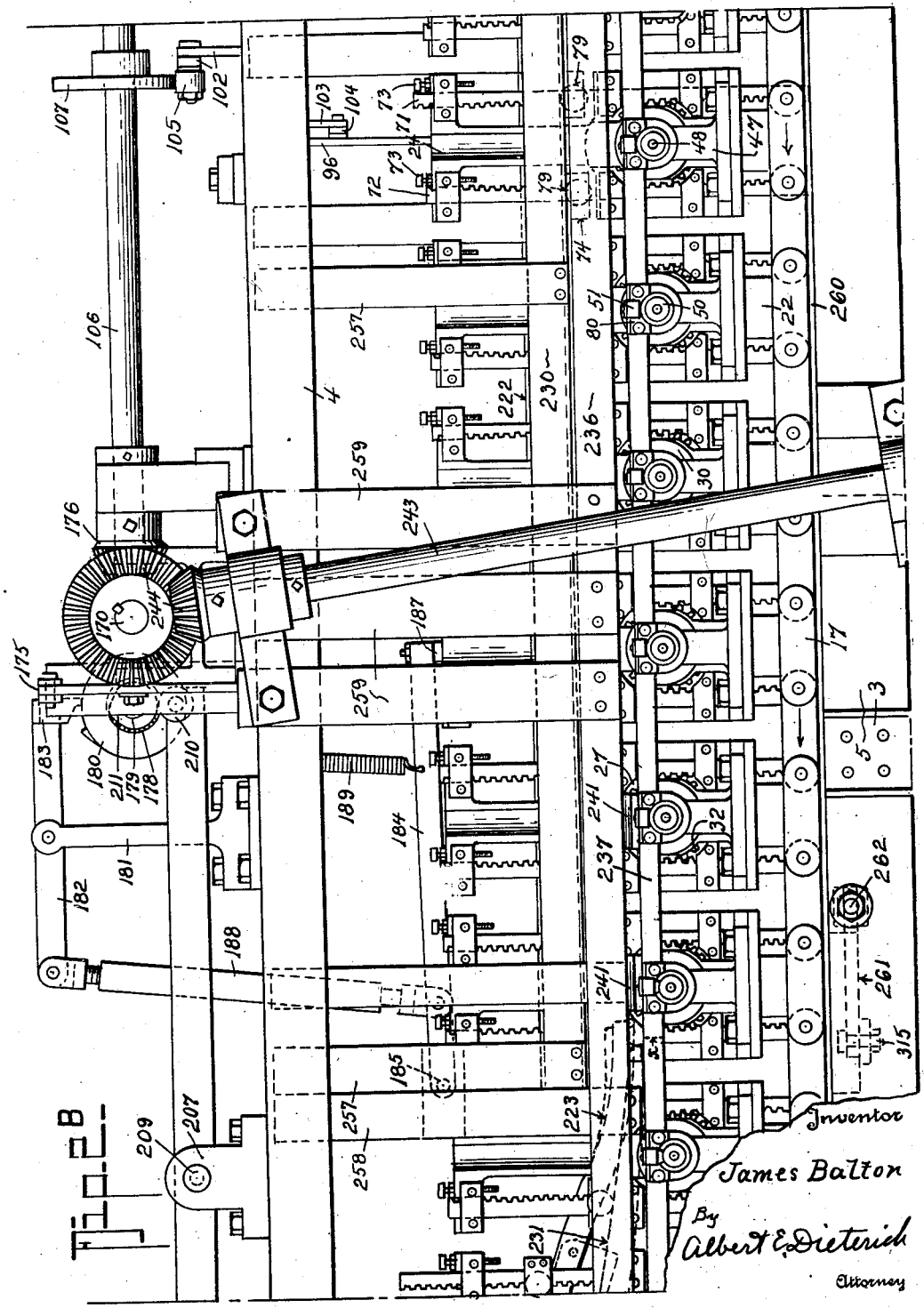

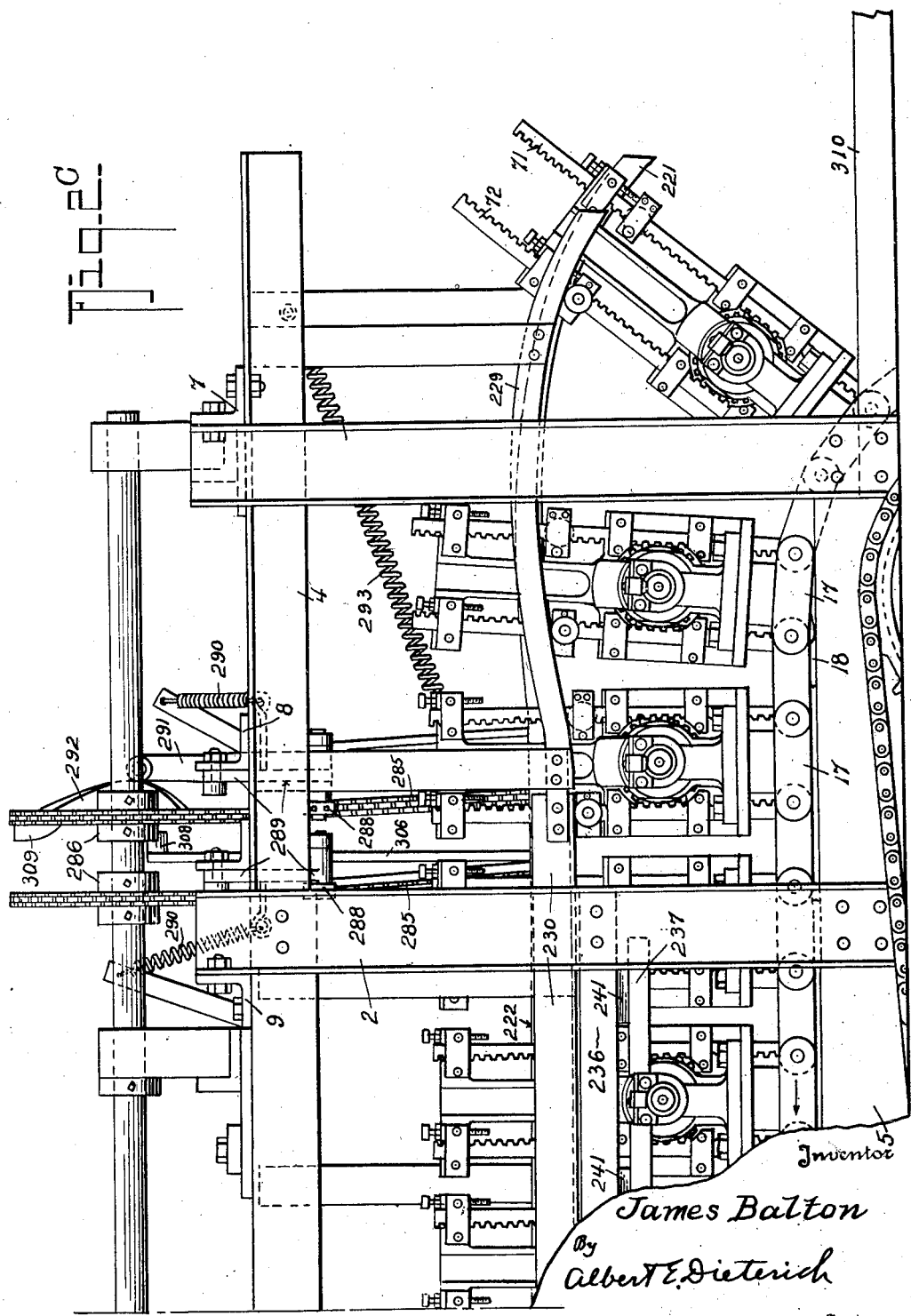

Feb. 13, 1945.   J. BALTON   2,369,205
JACKET FORMING MACHINE
Filed Feb. 19, 1941   21 Sheets-Sheet 10
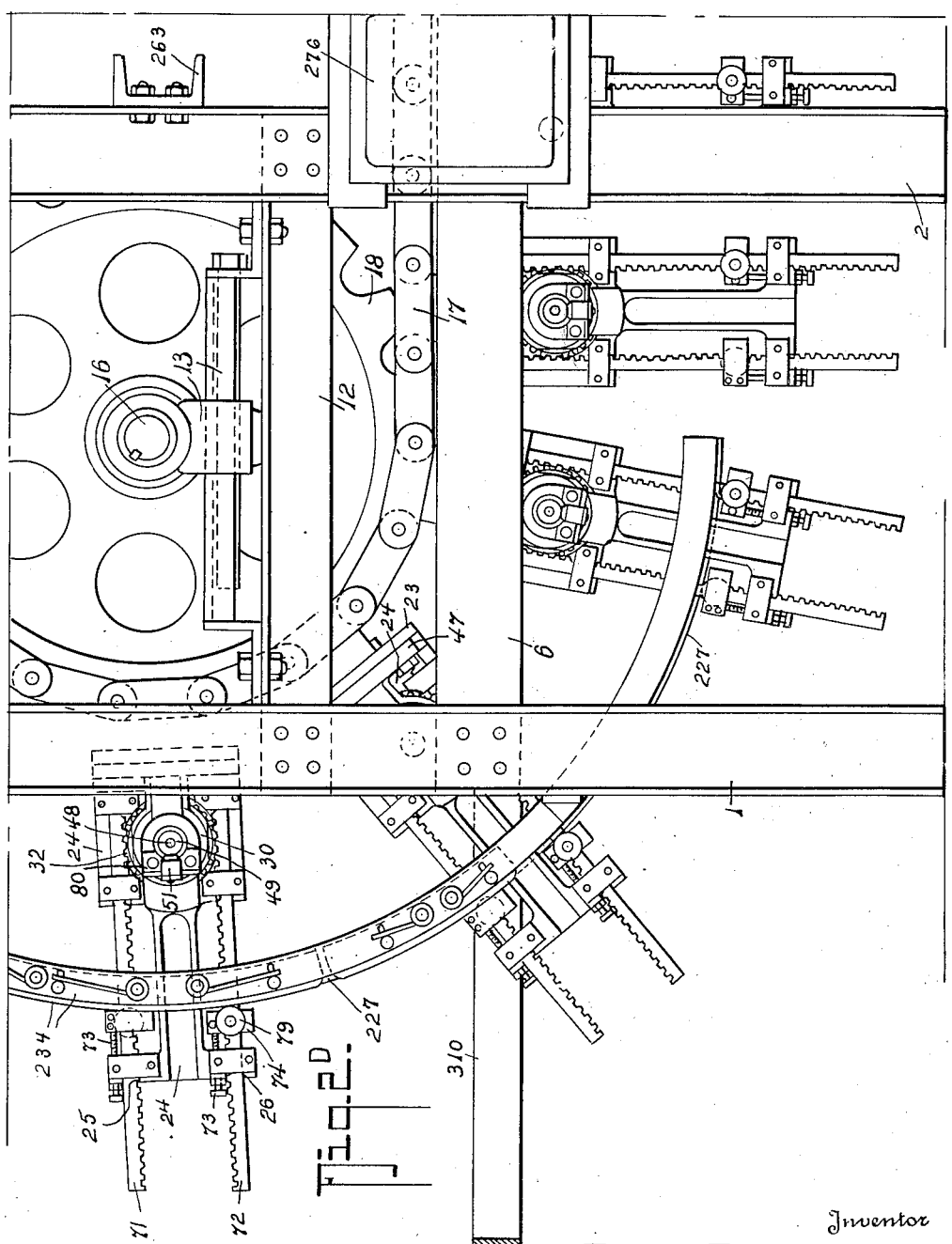
Inventor
James Balton
By Albert E. Dieterich
Attorney

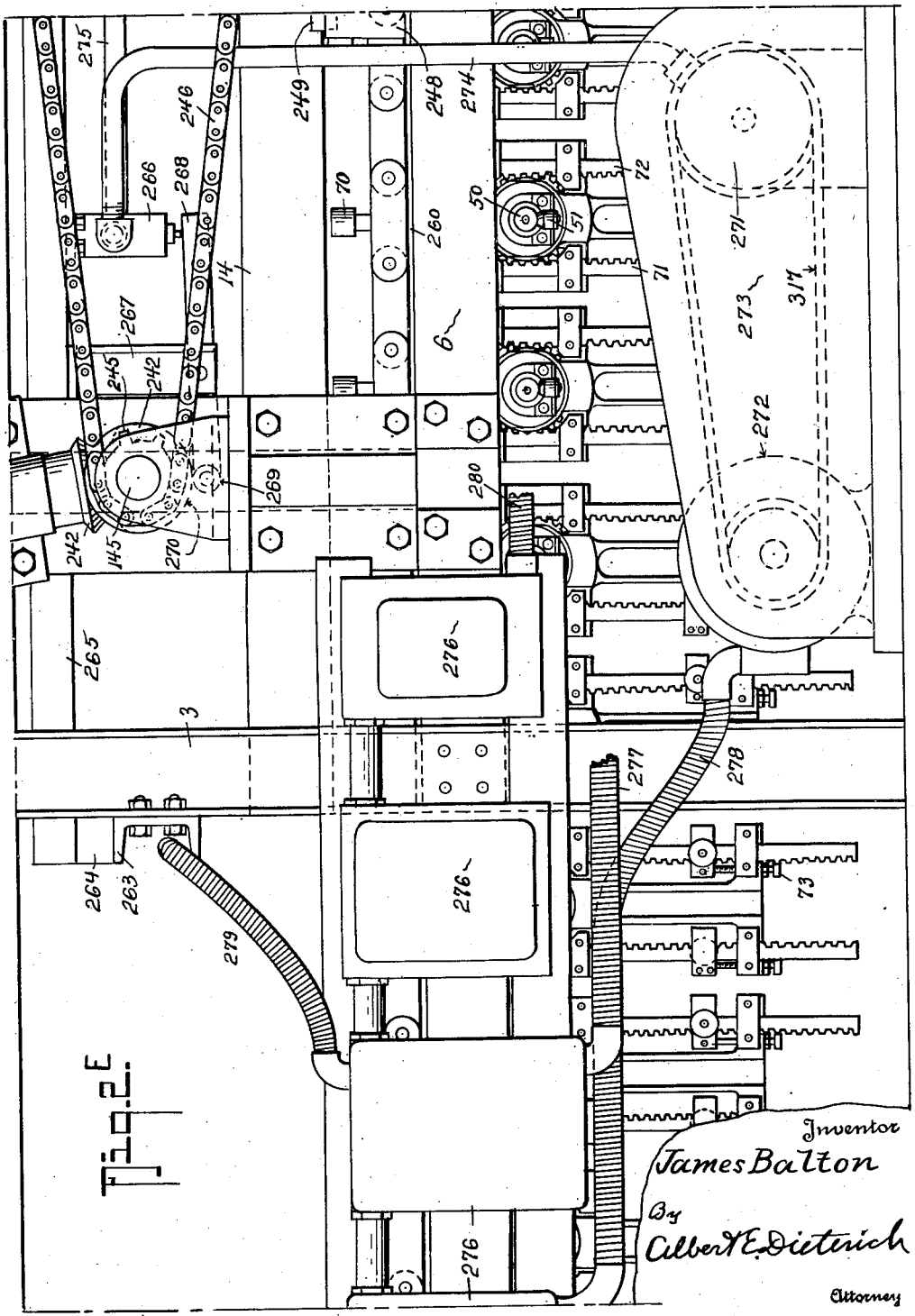

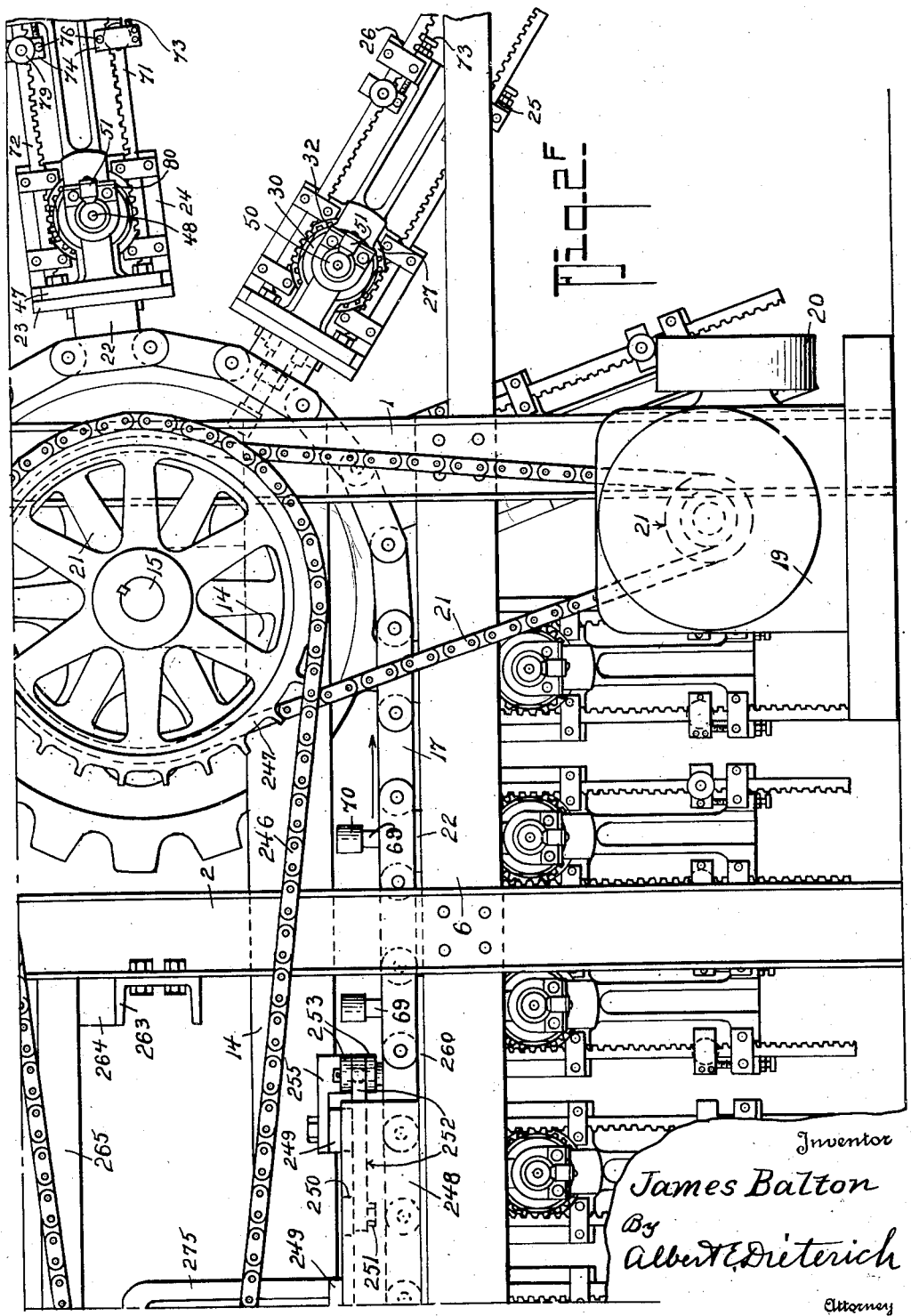

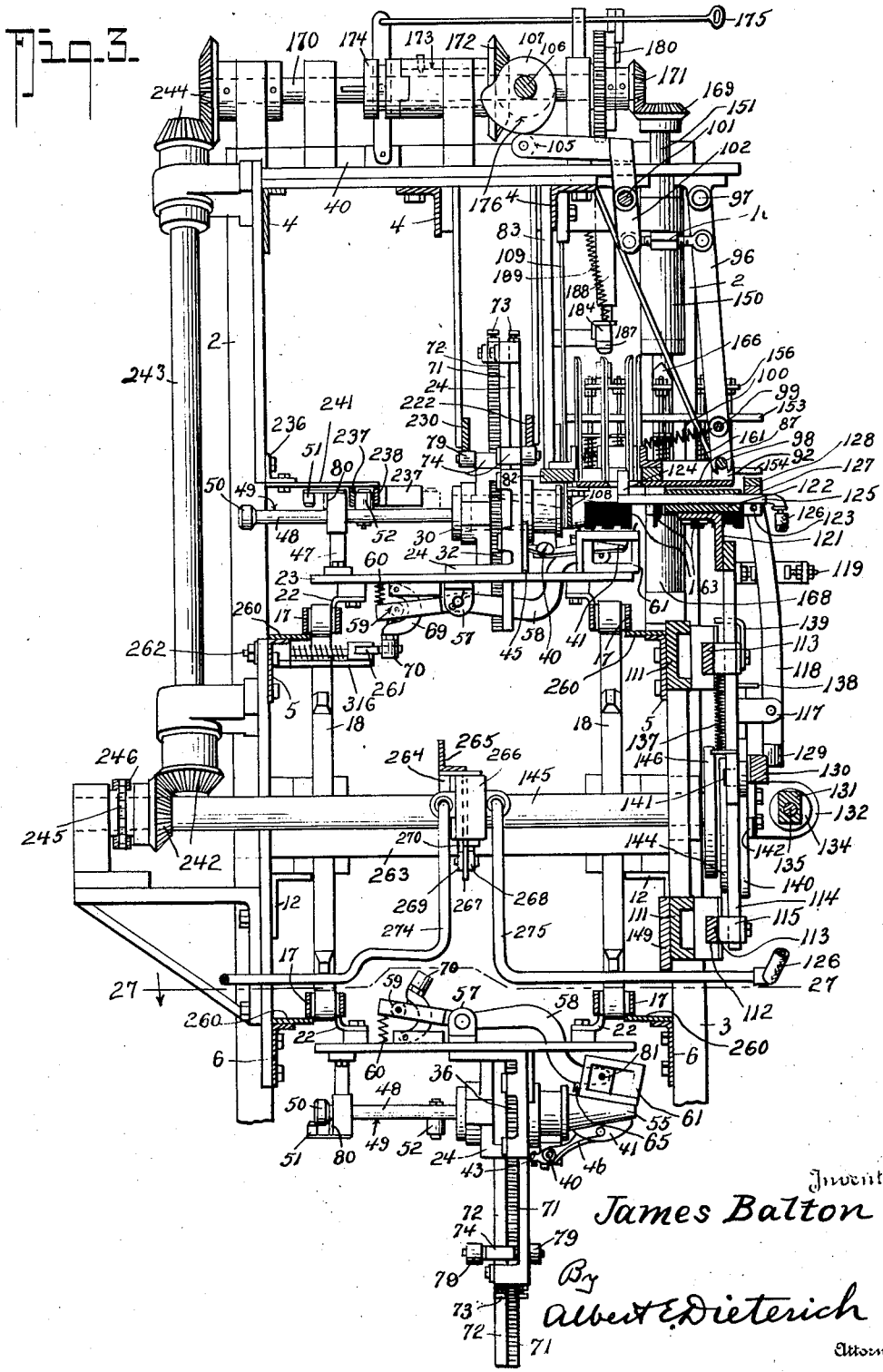

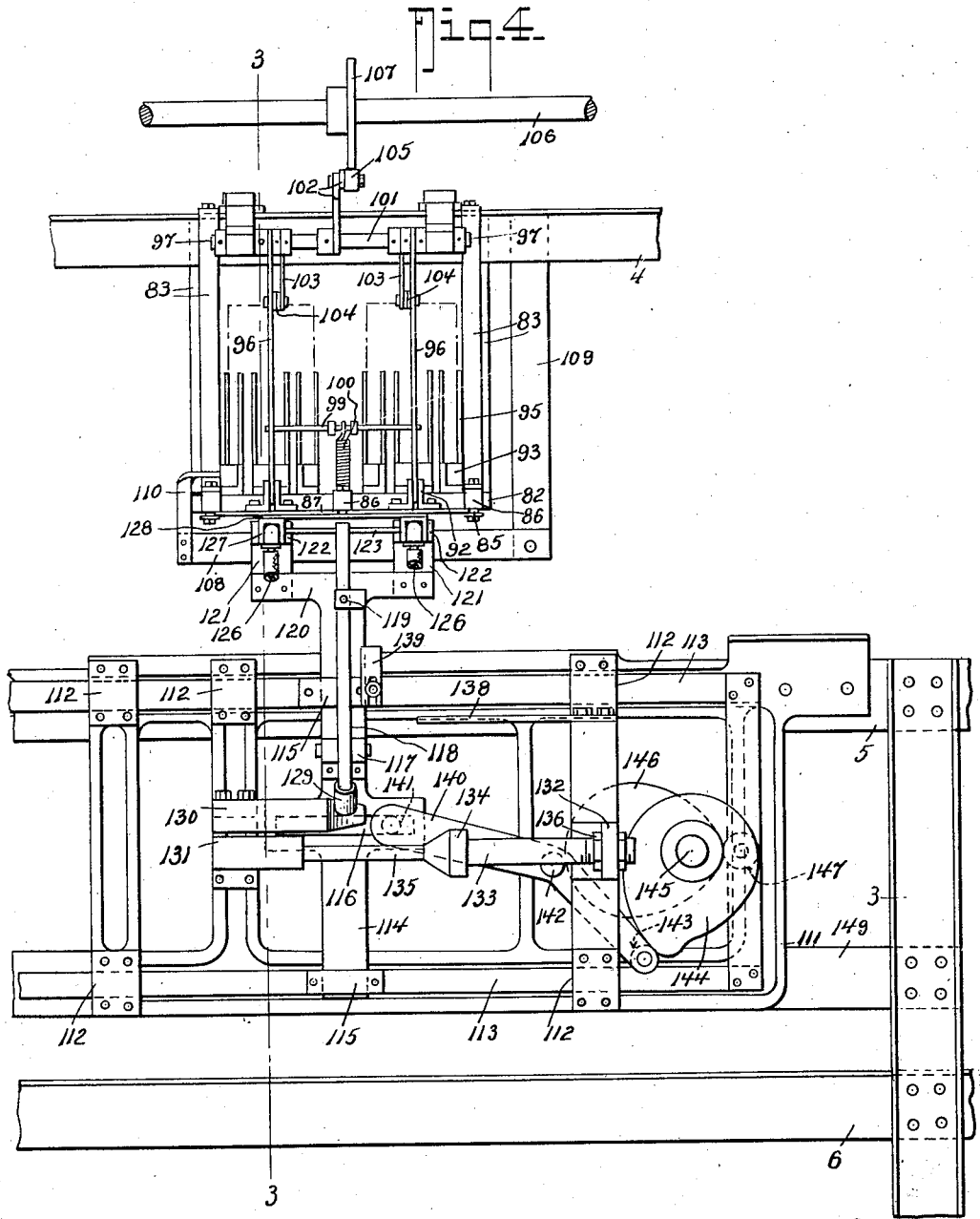

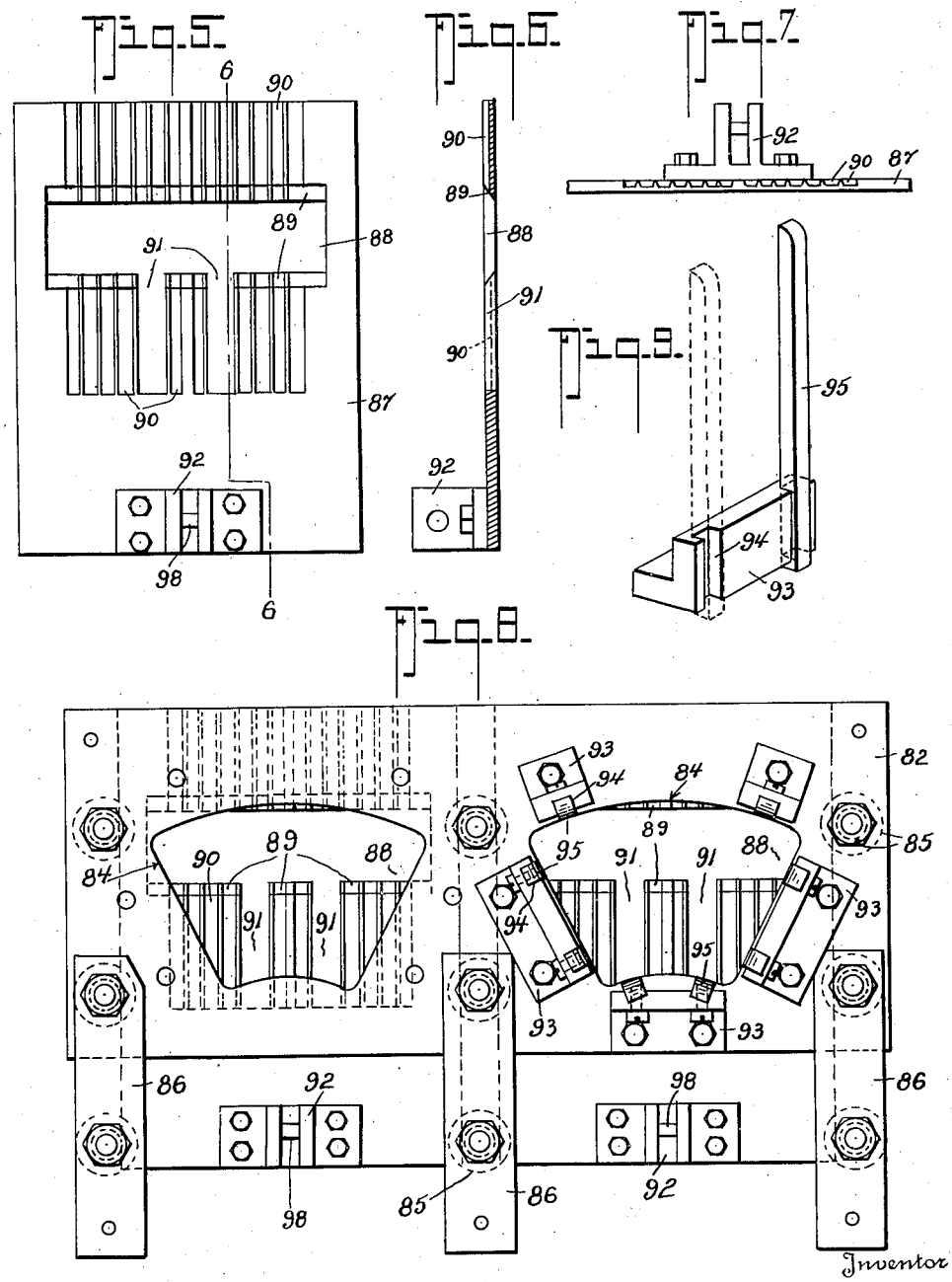

Feb. 13, 1945.  J. BALTON  2,369,205
JACKET FORMING MACHINE
Filed Feb. 19, 1941  21 Sheets-Sheet 16
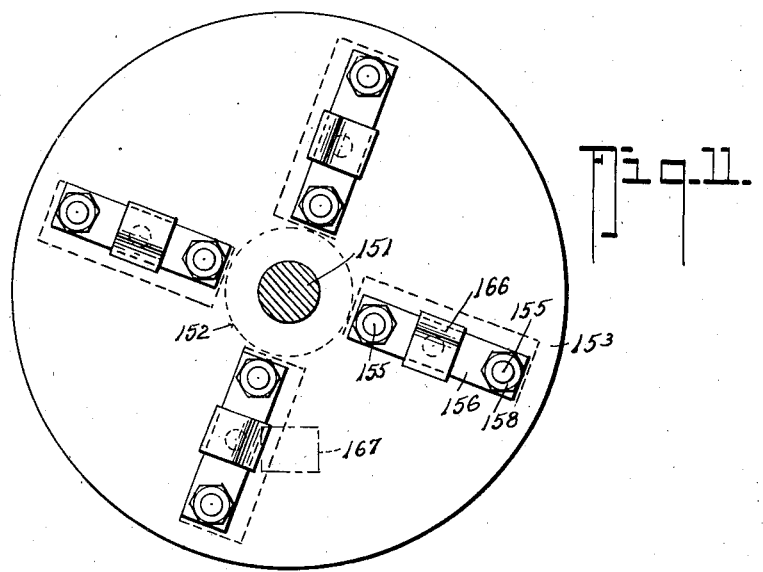
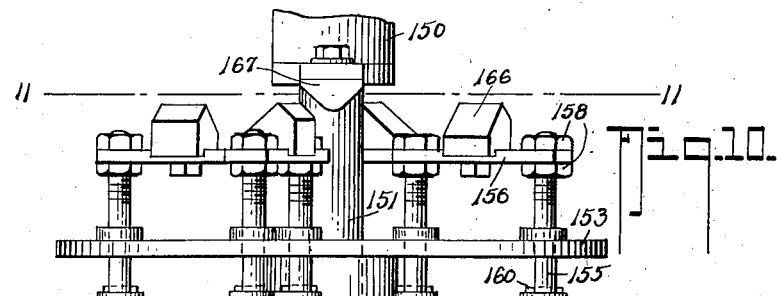
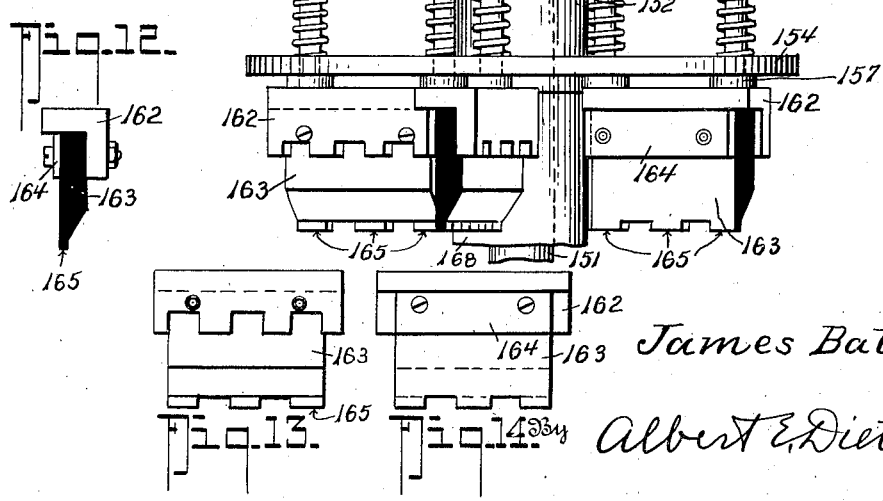
Inventor
James Balton
Albert E. Dieterich
Attorney

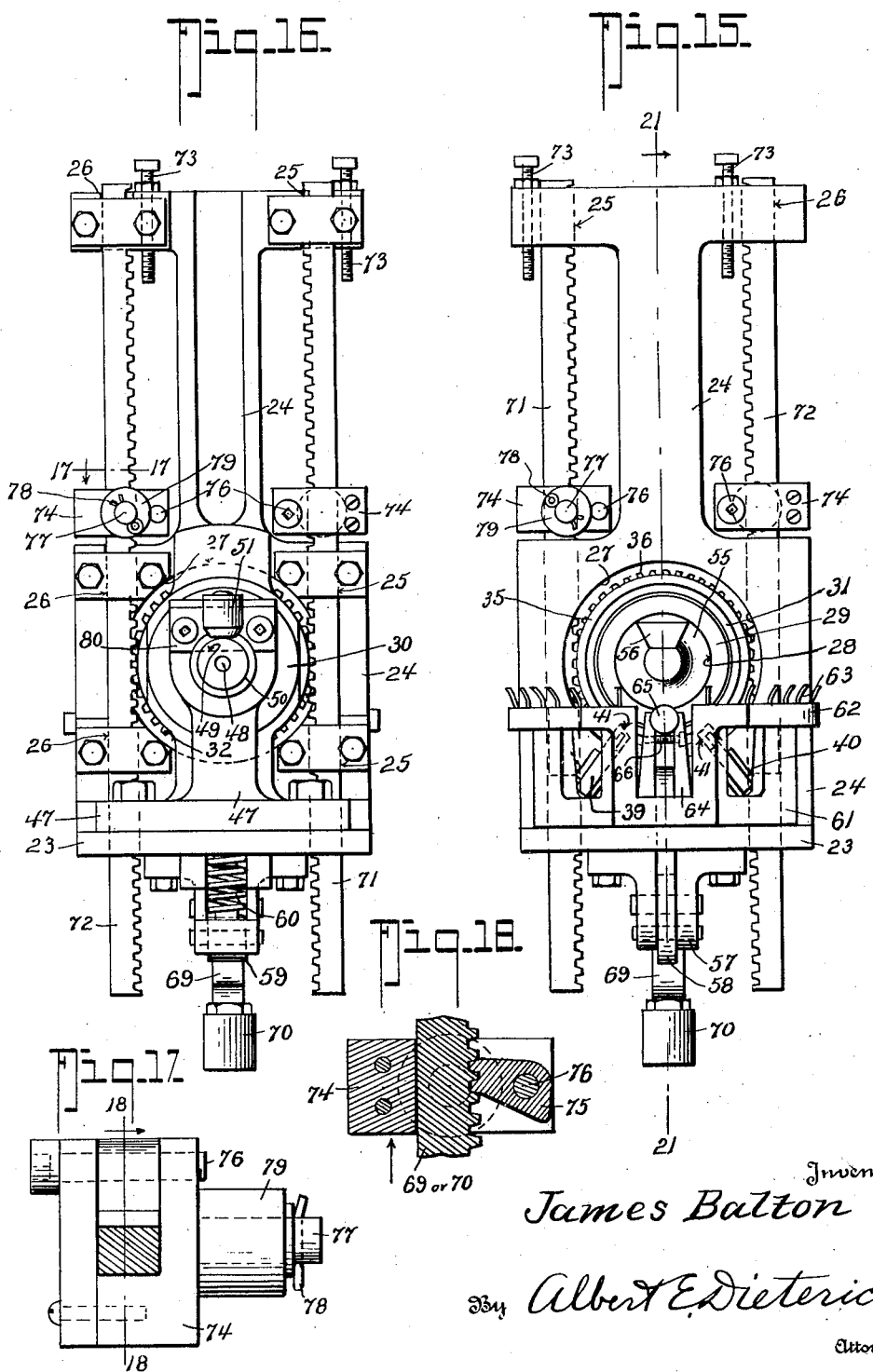

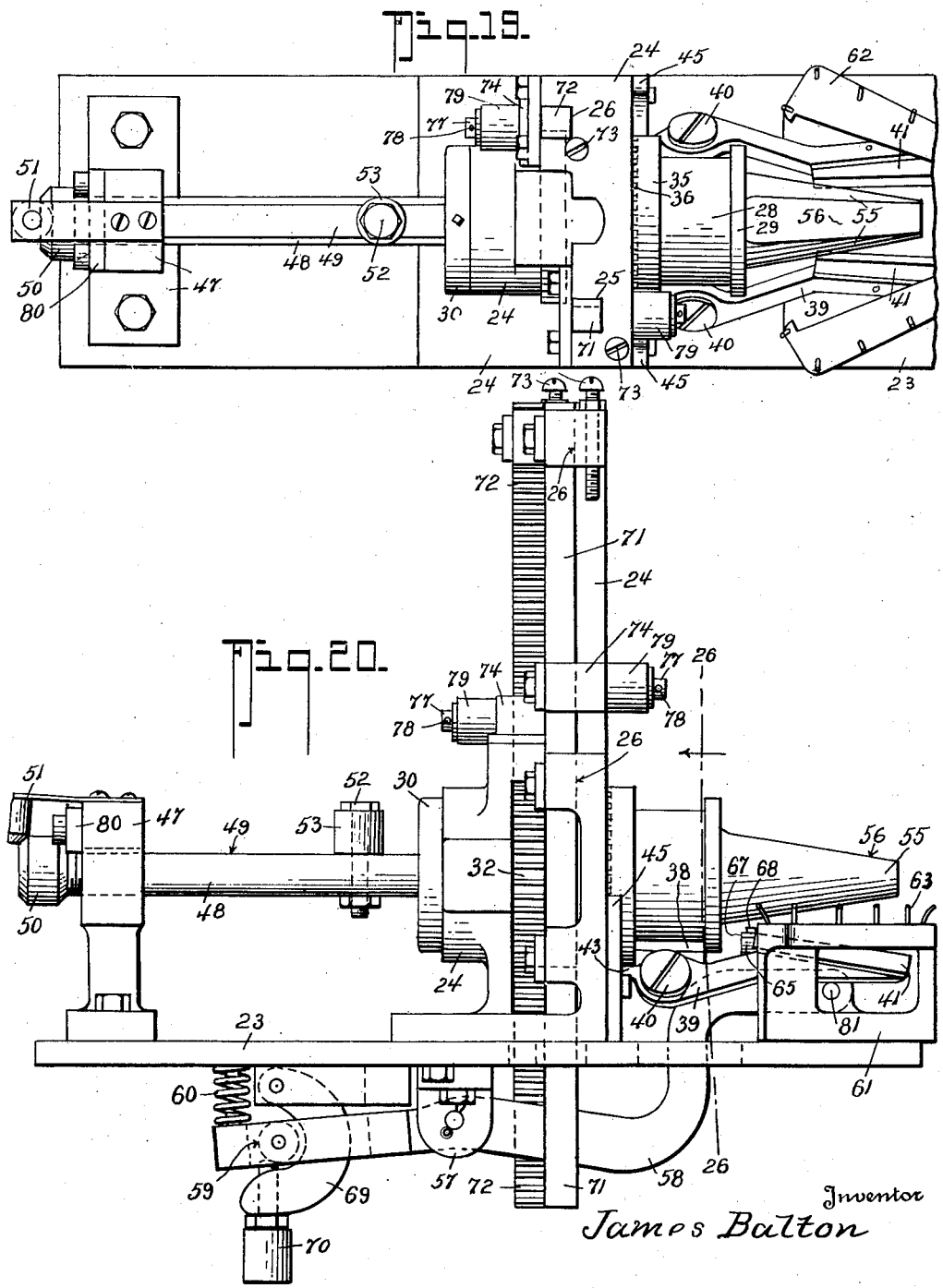

Feb. 13, 1945.    J. BALTON    2,369,205
JACKET FORMING MACHINE
Filed Feb. 19, 1941    21 Sheets-Sheet 19
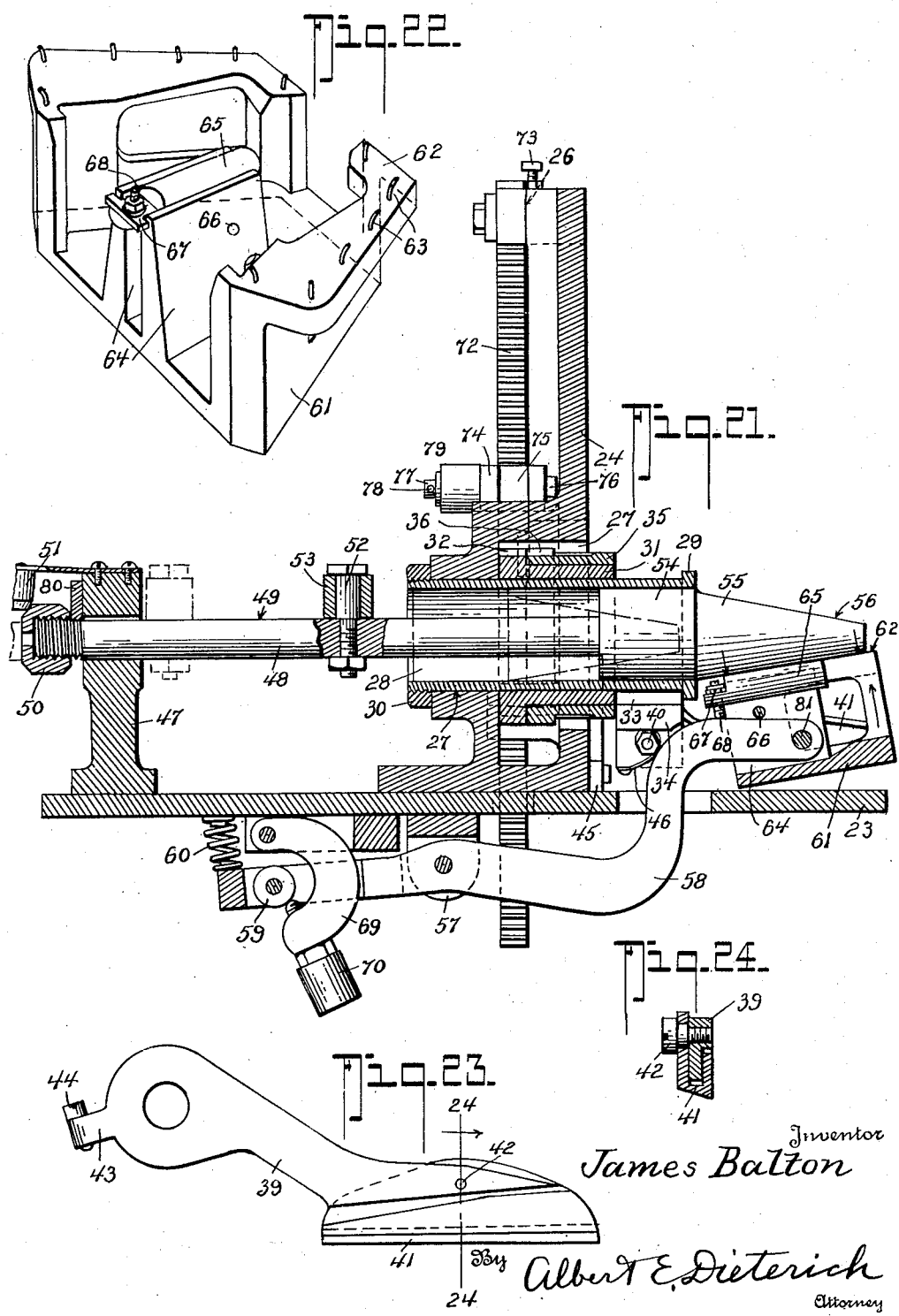

Feb. 13, 1945.  J. BALTON  2,369,205
JACKET FORMING MACHINE
Filed Feb. 19, 1941   21 Sheets-Sheet 20

Inventor
James Balton
By Albert E. Dieterich
Attorney

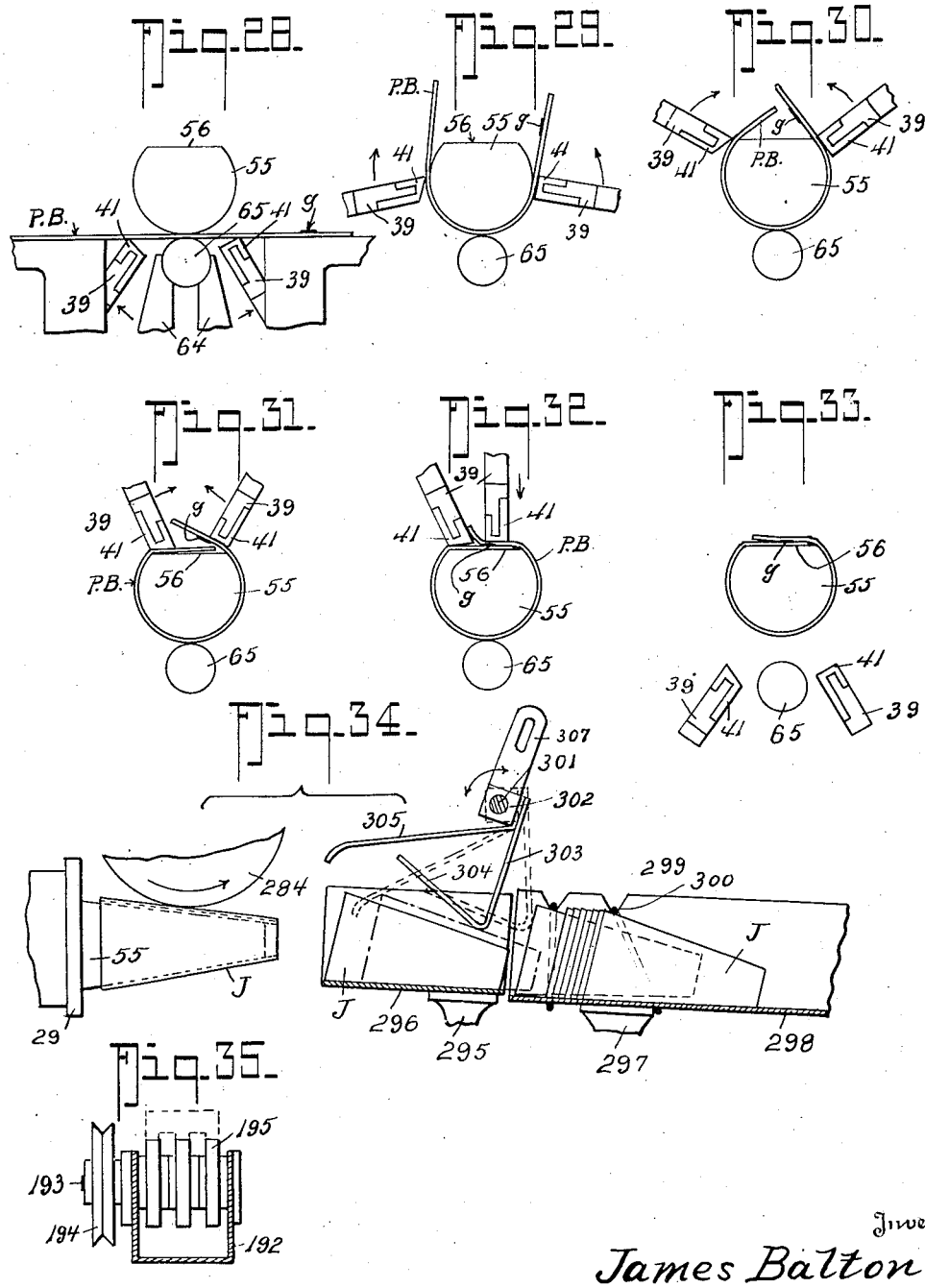

Patented Feb. 13, 1945

2,369,205

UNITED STATES PATENT OFFICE 2,369,205

JACKET FORMING MACHINE

James Balton, Baltimore, Md., assignor to Maryland Baking Company Inc., Baltimore, Md., a corporation of Maryland Application February 19, 1941, Serial No. 379,727

48 Claims. (Cl. 93—79)

My invention is a machine for forming frusto-conical jackets from paper blanks, particularly jackets for use on the stems of ice cream cones.

Primarily the invention has for an object to provide a machine for the purpose stated which will take the blanks, one at a time from a stack, bend the blank to form with its longitudinal edges overlapped, gum the overlapped portions together, and nest the finished articles on discharge from the formers.

More subordinately, the invention seeks to provide a machine which is wholly automatic one which will operate at maximum efficiency.

Again, it is an object to provide a new and improved mechanism for removing one blank at a time from a stack and depositing it on a carriage, by which the blank is conveyed along the machine from the blank supplying or loading station of the machine to and through the glue-applying station, the shaping stations, to the discharge station.

Another object is to provide a new and improved means for holding the blank on the carriage while the glue applicator operates.

Further, it is an object to provide means for wiping and polishing the forming mandrel before each application of a jacket blank to the same.

A still further object is to provide a new and improved travelling unit, comprising generally, a blank carriage, a form-mandrel, and blank folding fingers.

Again, it is an object to provide means to ensure that the glued parts of the blank, after the blank has been formed, will stick tightly together and not accidentally become opened or separated thereafter.

Further, it is an object to provide a new and improved mechanism for stripping the finished jackets from the mandrels at the discharge station of the machine and delivering the jackets individually into a receiver.

Further, it is an object to provide a new and improved means to remove the jackets from the receiver and deposit them in nested relation into a chute or trough from which sticks of nested jackets may, from time to time, be removed by an attendant.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 (composed of Figs. 1$^A$ to 1$^F$ inclusive) represents a front elevation of the machine.

Fig. 2 (composed of Figs. 2$^A$ to 2$^F$ inclusive) shows the machine in rear elevation.

Fig. 3 is a cross section of the machine taken on the line 3—3 of Figs. 1$^B$—1$^D$ and the line 3—3 in Fig. 3.

Fig. 4 is a detail front elevation of the blank magazine and the mechanism by which the blanks are removed from the stacks and delivered to the carriages.

Fig. 5 is a detail plan view of one of the slides of the blank magazine.

Fig. 6 is a section on the line 6—6 of Fig. 5.

Fig. 7 is an edge view of Fig. 5 looking from top to bottom in that figure.

Fig. 8 is a detail plan view of the magazine, one set of blank-stack guiding and positioning rod devices being omitted.

Fig. 9 is a detail perspective view of one of the blank-stack guiding and positioning rod units.

Fig. 10 is a side elevation of the glue applying turret.

Fig. 11 is a horizontal section on the line 11—11 of Fig. 10.

Fig. 12 is an edge view of one of the applicators.

Fig. 13 is a side elevation of the same.

Fig. 14 is a side elevation showing the other side of the applicator.

Fig. 15 is a front elevation of one of the blank forming units.

Fig. 16 is a rear elevation of the same.

Fig. 17 is an enlarged detail section on the line 17—17 of Fig. 16.

Fig. 18 is a section on the line 18—18 of Fig. 17.

Fig. 19 is a top plan view of the unit.

Fig. 20 is a side elevation of the same.

Fig. 21 is a central vertical longitudinal section of the unit.

Fig. 22 is a perspective view of the carriage per se.

Fig. 23 is an enlarged detail elevation of one of the blank turning and holding fingers.

Fig. 24 is a detail section on the line 24—24 of Fig. 23.

Fig. 27 is a detail plan view of the carriage locking cam device.

Figs. 28 to 33 are diagrammatic views illustrating the operation of applying a blank to the mandrel and effecting adhesion between the overlapped portions.

Fig. 34 is a detail vertical section of the jacket stripper and the receiving and nesting mechanism.

Fig. 35 is a cross section of the glue pot.

Fig. 36 is a diagrammatic view of the tracks for producing axial movement of the mandrel.

Figure 26:
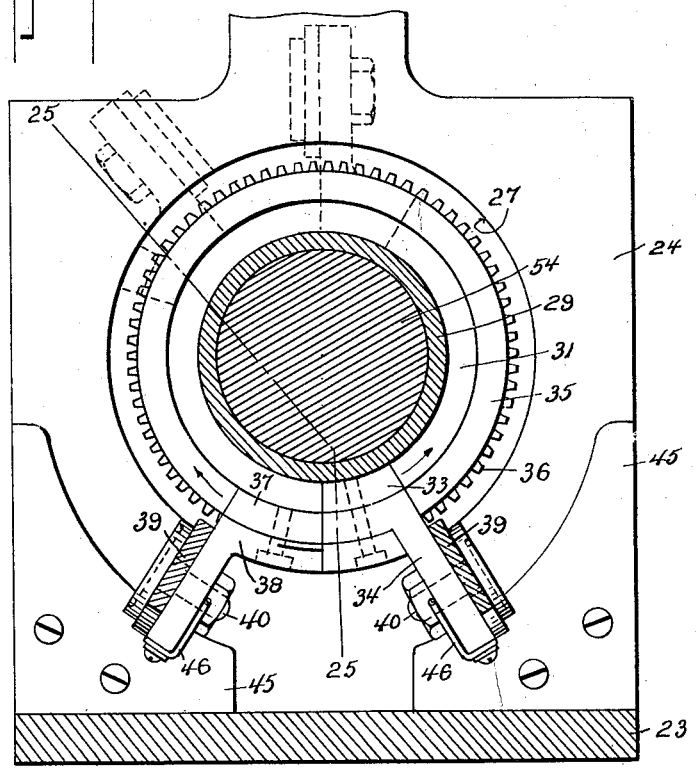
Fig. 26 is an enlarged detail cross section on the line 26—26 of Fig. 20.

In the drawings, in which is illustrated a preferred embodiment of my invention and in which like numbers and letters of reference indicate like parts in all the figures, it will be seen that the supporting frame of the machine includes the end uprights 1, the main intermediate uprights 2, the short intermediate uprights 3, the upper longitudinal beams 4, the intermediate longitudinal beams 5, the lower longitudinal beams 6, and the top cross angles 7 to 11 inclusive, all of which parts are securely fastened together in any suitable way, as by bolts and nuts, for example.

The machine is of the endless-chain-conveyor type which embodies a drive shaft 15 mounted in fixedly located bearings on supports 14, 14ª (Figs. 1ᴰ and 2ᶠ) and a driven shaft 16 mounted in slidable bearings of a chain tightener 13 (Figs. 1ᶠ and 2ᴰ), mounted in turn on a suitable support 12. The shafts 15 and 16 carry spaced-apart sprockets 18 around which endless chains 17 pass, the shafts 15, 16, sprockets 18 and chains 17 thus constituting an endless-chain type conveyor.

Power is applied to the shaft 15 by means of an electric motor (not shown) belted to a pulley 20 (Fig. 2ᶠ) which, through any suitable reduction-gear mechanism 19, imparts its power, via a sprocket and chain connection 21, to shaft 15.

Alternate links of the chains 17 are formed with brackets 22 to which are secured, crosswise of the chains, the base plates 23 of the jacket shaping units.

The jacket shaping units

One of these units is illustrated, on an enlarged scale, in detail in Figs. 15 to 26 inclusive, to which figures reference will now be made. Each unit comprises a base plate 23 on which is mounted a main standard 24 that has suitable slideways 25 and 26 for rack bars 71 and 72 respectively. The main standard 24 has a bore 27 in which is held a bearing sleeve 28 having a flange 29 at its front end and a nut 30 at its rear end. The sleeve 28 projects a predetermined distance in front of the standard 24 for a purpose presently made clear.

Figure 25:
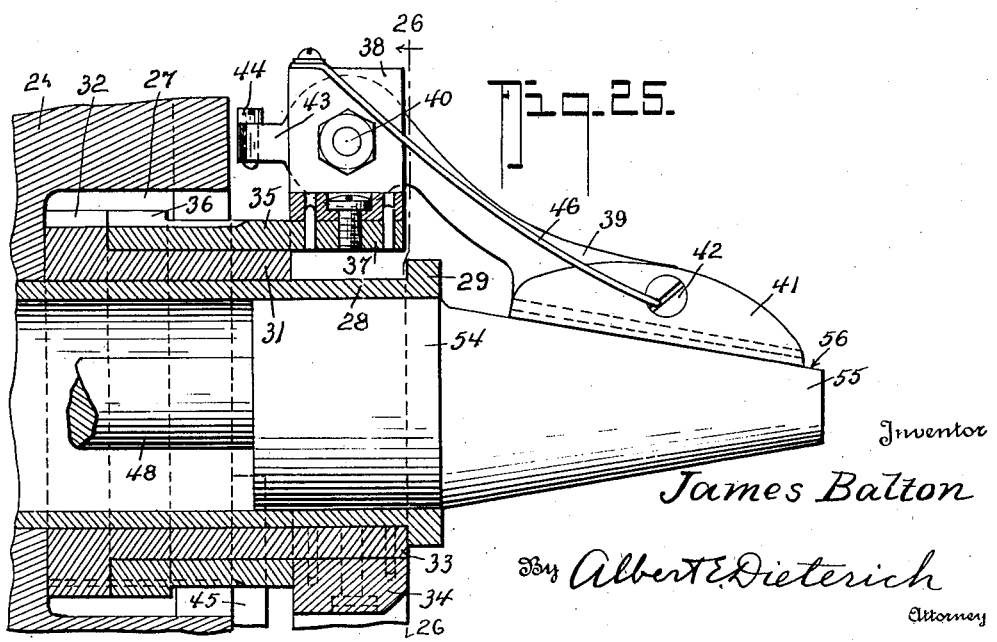
Fig. 25 is a section on the line 25—25 of Fig. 26, with the left finger (Fig. 26) shown in the upper position as shown in dotted lines in Fig. 26 and the right finger omitted.

Rotatably mounted on the sleeve 28 is the inner rotatable gear-sleeve 31 having gear teeth 32, the sleeve 31 being provided with an outwardly projecting lug 33 extending to flange 29 (Figs. 21 and 25). As one end of sleeve 31 abuts the standard 24 and the other end abuts the flange 29, the sleeve 28 is held from endwise or axial movement in the bearing portion of bore 27.

Secured to the lug 33 is a bracket 34 on which a jacket shaping or bending finger bar 39 is pivoted as at 40.

Rotatably mounted on the sleeve 31 is an outer gear-sleeve 35 whose gear teeth 36 abut the teeth 32 and whose outer end has an outwardly projecting lug 37, to which a second bracket 38 is secured. A jacket shaping or bending finger bar 39 is pivoted at 40 to the bracket 38.

Both finger bars 39 carry paper pressers 41 which are pivoted at 42 and have a limited range of rocking movement on such pivots. Each finger bar 39 also has a lug 43 carrying an adjustable screw 44 for contacting suitably shaped cam plates 45 (Figs. 19, 20, 21 and 26) by which the fingers are held retracted from the mandrel 55 with which they cooperate to shape the blanks. The finger bars 39 are constantly urged toward the mandrel by presser springs 46 (Fig. 25).

Mounted near the rear end of the base 23 is an auxiliary standard 47 having a slide bearing for the mandrel shaft 48 which projects into sleeve 28 and carries the mandrel 55 and its bearing head 54. The head 54 slides in sleeve 28.

At its rear end shaft 48 carries a bevelled edge button 50 with which a spring-latch device 51 (Figs. 18, 19, 21) cooperates to hold the mandrel out, i. e., in its forward or operative position. The shaft 48 has a flat portion 49 with which a plate 80 on standard 47 cooperates to hold the shaft from turning.

A stud 52 secured to shaft 48 carries a roller 53 for cooperation with cam tracks 237 and 238, hereinafter again referred to.

The mandrel 55 is of frusto-conical form, save for a flat top area 56, the purpose of which will be clear presently.

57 is a split lug on the under side of the base plate 23 in which a lever 58 is pivoted. The lever 58 has a slot in which is mounted a roller 59 to cooperate with a latch 69 that is pivoted beneath the plate 23 and projects through said slot (Fig. 21). The latch 69 carries a roller 70 for cooperation with locking and unlocking cam devices later to be described. A spring 60 continuously tends to move lever 58 in one direction.

The forward end of the lever 58 projects up through a slot in base 23 and is pivoted at 81 to the jacket blank carriage 61. This carriage is preferably of skeleton form and has flat flanges 62 shaped to conform generally to the paper blank. The flanges 62 are provided with paper blank positioning pins 63 of suitable number and placement (Fig. 22).

Between the flanges is a space in which a split support 64 is located and in the split of which the lever 58 is pivoted.

Located in suitable grooves and between the legs of the support 64 is a cylinder 65 which is clamped in place by means of a clamp screw 66 (Figs. 21, 22).

The axis of the cylinder 65 lies in the same vertical plane as that of the mandrel 55 at all times and is held against creeping forward by means of a shim 67 secured to the reduced rear end of the cylinder by an adjustable screw device 68.

As shown in Fig. 21, the carriage 61 is overbalanced to the rear so that as lever 58 lifts the carriage it will tend to bring its top face parallel with the lower edge of the mandrel (Fig. 21). In order, however, to prevent the forward end of the cylinder 65 from bringing the forward end of the paper into contact with the mandrel first, the screw 68 is adjusted to engage the lever 58 before the front end of 65 contacts the paper and so that the entire length of the cylinder will cause the paper blank to contact the mandrel along its length simultaneously. Were the front end to make contact first, it would tend to move the paper toward the small end of the mandrel, which would prevent uniformity in the jackets.

The main standard 24 carries adjustable stops 73 to limit the rise of the rack bars 71 and 72. These bars carry adjustable roller-carrying blocks 74 which are bifurcated to fit over the bars. Each block is provided with a toothed dog 75 that engages the rack (Figs. 17 and 18) and the parts are secured by tightening a clamp screw 76 that passes through the dog. Each block 74 has a stud 77 on which is a roller 79 that is held in place by a cotter pin 78.

The shaft 48 is held from turning by a plate 80 that engages the flat surface 49 and is secured to the auxiliary standard 47 (see Figs. 19, 20, 21).

The carriage 61 is pivoted to the upper end of the lever 58 at 81.

*The blank magazine and blank delivering mechanism*

Referring now more particularly to Figures 1$^A$, 1$^B$, 1$^D$, 1$^E$, 3, 4 and 5 to 8 inclusive, it will be observed that there is provided a base 82 which, in the embodiment illustrated, contains two openings 84 of a size and form to receive the jacket blanks (one or more openings may be provided as desired). When two or more openings 84 are provided in the base 82 they are spaced apart the same as the carriage units are spaced so that a corresponding number of carriages may be supplied simultaneously. The base 82 is suitably supported from the frame of the machine, as at 83, at what—for convenience—might be called the loading station of the machine.

Beneath each opening 84 lies a slide or gate 87, which is supported by rollers 85 bolted to the bottom of the base 82 and to the extension bars 86. The plate 87 cooperates with the suction devices, later explained, to effect separation of the lowermost blank from the stack.

Each plate 87 has a cross slot 88, the longitudinal (front and back) edges of which are bevelled as at 89. The upper face of the plate is grooved in the direction of its movement as at 90 so as to present as small a surface area to the blank as possible and thus avoid friction on the blanks when the plate is moved back and forth. The plate 87 is also longitudinally slotted as at 91, the slots lying adjacent the front edge corners of the opening 84.

Located adjacent the margin of the openings 84 on the top side of the base 82 are a number of blocks 93 having grooves 94 in which are secured upstanding bars 95 which hold the stack of blanks (see dot and dash lines, Fig. 4) in place to line up with the openings 84. The bars 95 at the front edge of an opening 84 extend down below the base 82 into the slots 91 and terminate (preferably) flush with the under face of the slide 87.

Each slide 87 is provided with a pivot ear 92 having a cross pin 98 to which a slide-moving arm 96 is connected. The arms 96 are pivotally mounted at 97 (Figs. 3 and 4) and are cross connected by a rod 99, a spring 100 being anchored to the rod 99 and to the base, and continuously tends to swing the arms 96 inwardly (backwardly). The arms 96 are linked by adjustable links 104 to short arms 103 on a rock shaft 101, to which a lever 102 is also secured. The lever 102 has a roller 105 that engages a cam 107 to operate the slides. The cam 107 is mounted on a shaft 106. A safety bar 108 (the purpose of which will later appear) is mounted beneath the base 82 and slides 87, as at 109, 110.

Mounted on the frame beam 5 and on a cross bar 149 attached to standards 3 is a casting 111 that is provided with slideways 112 in which is mounted a horizontally reciprocable frame 113. The frame 113 has slideways 115 in which is mounted a vertically reciprocable bar 114. The bar 114 has a cross slot 116 in which operates a roller 141 that is carried by a lever 140, later again referred to.

The bar 114 has a bracket 117 to which is pivoted a lever 118 whose pivotal movement is limited by means of adjustable stops 119 (Fig. 3). The bar 114 also has a cross arm 120 to which brackets 121 are secured in spaced relation (Fig. 4). These brackets each carry a suction nozzle bar bearing 122.

The suction nozzles 124 have their bars 125 slidably (but not rotatably) mounted in the bearings 122 and at their outer ends the bars 125 have clamps 127 which are cross-connected by a bar 128 and a rod 123.

The lever 118 is connected to the rod 123 and serves to move the nozzle bars 125 in and out (back and forth). Each bar 125 has a bore (not shown) with which a flexible hose 126 is connected by a hose fitting, the other end of the hose being connected with the suction pipe 275.

The lever 118 has a roller 129 at its lower end to cooperate with a fixed cam 130 mounted on the frame 111 and with an adjustable cam 134 carried on a rod 133 that is longitudinally adjustably mounted on a bracket 132 by means of nuts 136 and whose reduced portion 135 is held in a fixed block 131.

On the rear of the bar 114 is a spring 137 which acts as a buffer on the up-stroke of the bar and to assist gravity in lowering the bar and maintaining contact between roller 143 on lever 140 and its operating cam 144. The lever 140 is pivoted at 142 to the casting 111.

The cam 144 is mounted on a transverse shaft 145 (Figs. 3 and 4). The frame 113 is reciprocated by means of another cam 146, on the shaft 145, that engages a roller 147 on the frame, and by a spring 148 which maintains contact between the cam 146 and roller 147.

The fall of the bar 114 is limited by an adjustable stop 139 secured to the frame 113 and a safety arm or cam track 138 is carried by the casting 111 to ensure the outward movement of the suction nozzle bars should roller 129 come off or should cam 134 break.

*The gluing mechanism*

The gluing mechanism is best shown in Figs. 1$^B$, 10 to 14 inclusive and 35, by reference to which it will be seen that in an upper bearing 150 and a lower bearing 168 is mounted a vertical shaft 151 to which is secured the hub 152 of a turret that comprises the said hub, the upper and lower discs 153, 154 respectively, and the parts carried by the discs. Such parts consist of four sets of dauber devices arranged radially 90° apart. Each dauber device consists of two rods 155 passing vertically through bearing holes in the discs and connected together at the top by a crosshead or plate 156 on which is secured a bevelled block 166. Beneath the disc 154 the rods 155 carry stop collars 157 and angle heads 162, to which heads the daubers 163 (rubber or other suitable material) are mounted by means of clamp plates 164 and screws. Each dauber 163 has one or more glue spotters 165.

The cross-heads 156 are vertically adjustably held on the rods 155 by nuts 158.

Springs 161 on the rods 155 abut washers 159, held by cotter pins 160, and the lower disc 154, and tend constantly to raise the daubers.

A fixed cam 167 is engaged by the bevelled blocks one at a time as the turret turns in order to depress the daubers onto the rollers 195 of the glue pot 192. The pot 192 is removably held on a bracket 190 by clamp screws 191.

The shaft 193 on which the rollers 195 are mounted is driven by a belt 197 taking around a pulley 194 on the shaft 193, and a pulley 198 on the shaft 16 (Figs. 1B, 1C, 1E, 1F). The amount of glue on the rollers 195 is regulated by an adjustable slide or plate 196 whose inner edge lies adjacent the rollers 195, the space between that edge and the rollers governing the thickness of the film of glue on the tops of the rollers.

At its upper end the shaft 151 has a bevel gear 169 that meshes with a bevel gear 171 on a cross shaft 170. The shaft 170 is driven from shaft 145 through a countershaft 243 and bevel gears 242 and 244 (Fig. 3).

A sleeve 173 is loose on shaft 170 and has a clutch face to cooperate with the shiftable clutch element 174 keyed to shaft 170 and operated by a shifting device 175. On the sleeve 173 is a bevel gear 170 that meshes with a bevel gear 176 on shaft 106 (Figs. 1B and 3).

There is also a spur gear 177 secured on shaft 170 to mesh with a pinion 178 on a stub shaft 179. On this stub shaft is mounted a cam 180 which cooperates with a cam-engageable nose 183 on a rocker arm 182 that is pivoted to a support 181 (Figs. 1B, 2B) and is connected by an adjustable connecting rod 188 with an arm 184 that is pivoted at 185 to a suitable support and carries a tappet 187 to engage the bevelled blocks 166 at proper times, as will later more fully appear. 186 is an arm adjusting screw.

Mounted behind the turret is a U-shaped bar 199 whose ends 200 are forked to receive the stud bolts 314 that adjustably secure the supports 201 to the bar. The supports 201 carry one or more grooved discs 202 around which taut wires 203 are passed and have their ends anchored as at 204. These wires lie horizontally across the paper blanks on the carriages as the carriages pass the turret at what might conveniently be termed the glue-applying station of the machine (Fig. 1B).

Just beyond the glue-applying station is a mandrel wiping device consisting of a bracket 205 carrying a wiper 206. As the mandrels pass this wiper they are being forced outwardly (forwardly) under the wiper, which wiper is so positioned that the entire length of the flat surface 56 will be wiped clean.

The glued-seam-pressing device

In order that tight adhesion may be had between the lapped glued portions of the jackets, I provide means to give a final squeeze or pressure to the glued joint of the jacket. This means will now be described, reference being had particularly to Figs. 1B and 1C. Pivoted at 209 to a suitable support 207 is a lever 208 one end of which has a roller 210 to engage a cam 211 on the stub shaft 179. Pivoted at 113 to the other end of the lever 208 is a presser arm 212 having a foot 214 under which the fingers 39 pass. The arm 12 is weighted at 218 and may also be spring-loaded as at 220, 219. It is normally held against an adjustable abutment 216 or bumper stop by a spring 217, the stop being mounted on a bracket 215 fixed to lever 208, to which bracket and to the arm 212 the spring 217 is anchored.

The cam-tracks

A curved track 221 is provided at the left end of the machine (Figs. 1A and 2C) which lies in front of the path of travel of the main standards 24.

The track 221 serves to lower the rack bars 71 when the track is engaged by the rollers 79 of those bars 71. The track 221 merges with a straightway track 222 that holds the rack bars 71 down while the units pass the unloading station, the loading station and the gluing station (Figs. 1A—1B). After passing the gluing station and the wiper 206, the rollers of rack bars 71 engage another track 223 (Fig. 1B) by which they are raised again. The raising track has a yieldable element 224 pivoted to the fixed track 223 at 225 (Fig. 1B), the unpivoted end of which element is resiliently supported by a spring-loaded rod 226 (Fig. 1C). From the element 224 a track 227 (which may in fact be a continuation of track 223) holds the rack bars 71 up until the unit has been inverted by being passed around the right-hand end of the machine (Figs. 1C, 1F). The entrant end of track 227 also has a spring-loaded section 228 which is yieldable to excessive down pressure on rack bars 71.

229 represents a curved track for lowering rack bars 72. This track lies in back of the path of standards 24 and cooperates with the rollers 79 on the block 74 of those rack bars. The track 229 merges with a straightway track 230 which holds down the rack bars 72 until the unit has passed by the mandrel wiper station (at D in Fig. 1B). Following the track 230 is a track 231 for raising the rack bars 72 (Figs. 2B and 2A). At its high end the track 231 is provided with a pivoted element 232 whose free end is carried by a spring-loaded suspension rod 233. Following this is a curved track 235 having yieldable spring-loaded sections 234 to hold up the rack bars 72. The track 235 extends around an end of the machine (Figs. 2A and 1C) a distance sufficient to hold the rack bars out until the unit becomes inverted (Figs. 2D, 1C).

The mandrels are shifted in and out by tracks 237 and 238 carried by a bar 236 which extends from end standard 1 in Fig. 2A to intermediate standard 2 in Fig. 2C. (See also Figs. 3 and 36.)

239 are short safety bars or tracks which are supported at 240 on the longitudinal beams 5, while 241 indicate supports secured to rail 236 and to the bars 237 and 238. The rollers 52 run between the bars 237 and 238, which bars are so shaped that when a unit leaves the position at A (Fig. 1A) and by the time it reaches the position at B (Fig. 1A) the mandrel will have been fully drawn into the sleeve 28 (see dot and dash lines, Fig. 21) and will remain in that position until the unit leaves the position at C (Fig. 1B). On leaving the position C the mandrel is moved outwardly until it is fully out by the time it reaches position E, being about two-thirds out at position D (Fig. 1B).

Hangers 257 support the tracks 230, while hangers 258 support the tracks 231 and hangers 259 aid in supporting rail 236.

The carriage locking and unlocking devices

The two devices are of essentially the same construction.

In Fig. 27 the locking mechanism is shown in full. On cross bars 249, supported on blocks 248 secured to the side bars 6 of the machine, is a bracket 250 that has pivoted to it at 251 a locking cam member 252. The cam 252 is spring loaded at one end by a rod 254 having a forked head 253 and extending through a bracket 255 and having adjusting nuts 256.

The unlocking mechanism (Figs 2B and 3) is similar to the locking mechanism and includes an unlocking cam 261 pivoted at 315 on a bracket 316 secured to the side beam 5 and having a spring-loaded rod 262 similar to the rod 254.

*The air suction control device*

On blocks 264, carried on cross angle bars 262, is mounted a longitudinal bar 265 on which an air valve 266 is mounted (Figs. 2E and 3). A bracket 267 is also mounted on the bar 265. To this bracket is pivoted the lever 268 which at one end engages the stem of the valve and at the other end has a roller 269 that engages a cam 270 on shaft 145. One side of the valve device 266 is connected by a pipe 274 to a suction pump 271 driven by an electric motor 272 through a suitable drive 317, guarded by a cover 273 (Fig. 2E). The other side of the valve is connected by a pipe 275 to the suction hose 126.

*Miscellaneous*

Suitable switch and circuit cut-out boxes 276 are mounted on the back of the machine (Figs. 2D and 2E) from which the wire conduits 279 (to a manual stop and start switch, not shown) and 277 and 278 to the power-supplying drive motor (not shown) and the suction pump motor 272 respectively run, and with which boxes the feeder conduit 280 is run. As the electric controls 276 are known and are not a part of my invention, detailed description thereof is thought to be unnecessary. Shaft 145 is driven from shaft 15 by a chain 246 and sprockets 245 and 247 (Figs. 2E and 2F).

*The jacket stripping and discharge mechanism*

By reference now to Figures 1A and 34 it will be seen that parallel arms 281 are pivoted at 282 and are connected by a link 283. The arms 281 are bifurcated and carry rollers or rotating discs 284 on shafts having sprockets over which driving chains 285 pass, the chains also passing over driving sprockets 286 on the shaft 106 and over fixedly located idler sprockets 287. The chains are kept taut by means of idler sprockets 288 on shafts rotatable in suitable bearings on swinging arms 289 pivoted to the angles 8 (see Fig. 2C). Springs 290 are connected to the arms 289 and to a fixed element on the frame and serve to keep sprockets 288 pressed against the chains 285. 291 represents a roller-carrying arm rigid with one of the arms 281 and cooperating with a cam 292 on one of the sprockets 286. The roller arm is kept in contact with the cam-sprocket and the arms 281 are continuously pulled toward one side with the rollers 284 free of the mandrels by a spring 293 (Fig. 1A). An adjustable stop bolt 311 limits the movement of the arms 281 under the influence of the spring 293.

An arm 295 secured to a bracket 294 supports a pair of V-shaped receivers 296 mounted on a cross bar 297.

Suitably mounted on suitably placed standards 318 (Fig. 34) are a pair of V-shaped troughs 298 which line up to receive jackets from the receivers 296. (The troughs are not shown in Fig. 1A but have been omitted to expose parts of the machine that would otherwise be hidden.) The troughs 298 have notches 299 on which rubber bands 300 are held to bridge the trough and act as yieldable holdbacks for the nested jackets J.

A shaft 301 held in a fixed position carries two connected blocks 302 to which pusher plates 303 and pushing fingers 305 are fastened. The plates 303 are bent to form guards 304 that prevent the jackets being thrown forward from the receivers 296 by the rapidly spinning discs 284.

A lever 306 has a roller 308 at its upper end to cooperate with a cam 309 on one of the sprockets 286, and at its lower end it is connected by a pin and slot connection to an arm 307 on the cross connection of the blocks 302. The arm and blocks turn together on the fixed shaft 301 to rock the pusher plates 303—304 and fingers 305 (see dotted lines, Fig. 34).

A bracket 312 supports a rest bar 313 directly beneath the base plates 23 at the discharge station so that the pressure by the discs 284 downwardly on the spindles will not cause the units to be depressed or yield.

Guard rails 310 are provided at the ends of the frame to protect persons against injury by the units as they pass around the ends of the machine.

*Operation*

The jackets are formed into conical form from previously cut blanks. These blanks are stacked in the magazines at the loading station. Glue of proper consistency is placed in the pot 192 and the slide 196 is properly adjusted. Motion is imparted to the conveyor to drive it continuously. Clutch 174 is thrown in to start the turret at the glue-applying station, the throw-off discs 284 and the blank feeding mechanism.

With nozzles 124 elevated and inward, Fig. 3, and gates or plates 87 out, valve 266 will be open.

The front end of the bottom blank in each stack is sucked against the upper end of the respective nozzle 124. As soon as the bottom blanks have thus been caught by the nozzles (which are at this time moving laterally with the same speed as the conveyor and in the same direction as the conveyor) the nozzles are lowered to deposit the blanks onto the carriages 61 beneath. As soon as the blanks reach the carriages valve 266 breaks the suction and the nozzles (which at the instant of release lie in the spaces between the sides of the carriages and in front of the supports 64) are quickly moved forward to clear the carriages and start their return movement for the next charge.

As soon as the bottom blanks of the stack are drawn partly through the openings 88 in the slide plates or gates, the gates 87 move back, the front bevel edges 89 entering between the blanks being withdrawn and the next above blanks thus hold back all but the blanks attached to the nozzles 124. The lower projecting ends of the bars 95 of the front blocks 93 (Fig. 8) also serve to stop a second blank from following down with the bottom blank which is being withdrawn through the slide plate or gate 87.

The carriages with the blanks deposited thereon then travel beneath the wires 203, past the glue-applying station. The daubers 163 of the turret take up glue as they pass over the glue wheels 195 by being for an instant pressed down in contact with the same by the engagement of the bevelled blocks 166 as they pass the fixed cam 167. (When a dauber comes into proper position over a carriage so as to be directly over and line up with the right-hand side of the blank on the carriage, the lever 184 is forced down for an instant and tappet 187 engages the bevelled block 166 of that dauber to stamp the glue on the paper.)

In passing the loading station and while receiving the blanks on the carriages the mandrels of those units are drawn in and remain so until the units pass the glue-applying station. On leaving the glue-applying station the mandrels come out again and their flat surfaces are wiped by the polisher 206, after which the carriages are unlocked and brought to the position shown in Fig. 21 and at E in Fig. 1B. This brings the cylinder 65 up against the blank and holds its at its midportion tightly to the mandrel (Fig. 28).

On travelling further the rack bars 71 and 72 are raised to wrap the blank P. B. about the mandrel 56 (Figs. 29 et seq.).

The left finger 39 reaches the edge of the flat portion 56 first and bends over the blank toward the flat surface 56 so that the other side edge of the blank will overlie the first (Fig. 30) where it is then held down while the right-hand finger 39 (Fig. 31) is completing its stroke or movement upwardly (Fig. 32). By the time the fingers have reached the position indicated in Fig. 32 the unit will have come in position beneath the presser arm 212 (Fig. 1C). As soon as the right-hand finger comes beneath the foot 214 cam 211 actuates lever 208 to lower presser 212 to cause the foot 214 to press down on that finger. As the unit is moving continuously during the time of contact, arm 212 swings on its pivot counter-clockwise in Fig. 1C but jumps back again quickly as soon as cam 212 releases lever 208. The pressing interval is but a few seconds, but is enough to insure proper adhesion by the glue g between the overlapped parts of the jacket.

In passing, attention is called to the fact that the glue spots are preferably spaced in from the edge of the blank so as to leave the top edge (Fig. 33) free and make it easy for the purchaser of a jacketed cone to remove the jacket with little or no tearing thereof.

On leaving the pressing station the units with carriage and fingers in the position shown at the right in Fig. 1C pass around the right-hand end of the machine (Figs. 1C—1F and 2A—2D) and are inverted and travel along the under side of the machine toward the left-hand end (Figs. 1D and 2F).

From Fig. 1F to Fig. 2F the weight of the rack bars 71—72 keeps the fingers in the position they assumed on passing the pressing station, Fig. 1C. On passing around the left-hand end of the machine the rollers of the rack bars engage the tracks 221 and 229 and the fingers are returned to their lowermost positions and away from the mandrel. Before reaching the left-hand end of the machine, however, the carriages 61 are again lowered flat against the bases 23 and locked by engagement of rollers 70 with the locking cam 252. Upon reaching the discharge station (Fig. 1A) arms 281 are swung to the right by cam 292 and discs 284 are brought into contact with the wrappers over the flat surfaces 56 and the wrappers are swept off the mandrels into the receivers 296.

As soon as a wrapper J is received it is projected into the preceding wrapper J in the trough 298 by the finger 305, the nested wrappers in the trough being pushed back by the curved lower end of plate proper 303, as indicated in Fig. 34. This completes a cycle of operation.

From the foregoing description, taken with the accompanying drawings, it is thought that the complete construction, operation and advantages of the invention will be clear to those skilled in the art.

What I claim is:

1. In a jacket forming machine, a continuously movable endless conveyor; at least one unit mounted on said conveyor to travel past a loading station, a glue applying station and a jacket discharge station; said unit including a blank receiving carriage, a mandrel, blank engaging fingers to wrap the blank around the mandrel and finger operating means; means located at the loading station for depositing a blank on said carriage while the carriage is passing the loading station; means at said glue applying station for applying glue to the blank when on the carriage and while the carriage is passing the glue applying station; means located between the glue applying station and the discharge station for actuating said finger operating means; and means at the discharge station for removing the finished jacket from the mandrel while the mandrel is passing the discharge station.

2. In a jacket forming machine, a continuously movable endless conveyor; at least one unit mounted on said conveyor to travel past a loading station, a glue applying station and a jacket discharge station; said unit including a blank receiving carriage, a mandrel, blank engaging fingers to wrap the blank around the mandrel and finger operating means; means located at the loading station for depositing a blank on said carriage; means at said glue applying station for applying glue to the blank when on the carriage and while the carriage is passing the glue applying station; means located between the glue applying station and the discharge station for actuating said finger operating means; and means at the discharge station for removing the finished jacket from the mandrel while the mandrel is passing the discharge station; said means which is located at the loading station comprising means for holding a stack of flat paper blanks, and means to remove a blank from the bottom of the stack and deposit it onto the carriage while the carriage is passing the loading station.

3. In a jacket forming machine wherein is provided a moving conveyor having at least one unit mounted thereon to travel past a loading station, which unit includes a blank receiving carriage; means located at the loading station for depositing a blank on said carriage, said means which is located at the loading station comprising means for holding a stack of flat paper blanks, and means to remove a blank from the bottom of the stack and deposit it onto the carriage while the carriage is passing the loading station, said removing means including a suction nozzle and means for bringing said nozzle in position to acquire a blank and then move the nozzle into a carriage, release the blank and withdraw the nozzle from the carriage.

4. In a jacket forming machine wherein is provided a moving conveyor having at least one unit mounted thereon to travel past a loading station, which unit includes a blank receiving carriage; means located at the loading station for depositing a blank on said carriage, said means which is located at the loading station including a base having a hole shaped to receive stacked blanks, a slide operatively mounted below said hole to sustain the stack of blanks, said slide having a transverse slot, means to move said slide back and forth beneath said hole, the slide when in the forward position exposing the forward edge of the bottom blank of the stack through said slot, and means entering said slot to take hold of the exposed portion of the blank and pull it down through said slot and deposit the blank on a passing carriage.

5. In a jacket forming machine wherein is provided a moving conveyor having at least one unit mounted thereon to travel past a loading station, which unit includes a blank receiving carriage; means located at the loading station for depositing a blank on said carriage, said means which is located at the loading station including a base having a hole shaped to receive stacked blanks, a slide operatively mounted below said hole to sustain the stack of blanks, said slide having a transverse slot, means to move said slide back and forth beneth said hole, the slide when in the forward position exposing the forward edge of the bottom blank of the stack through said slot, and means entering said slot to take hold of the exposed portion of the blank and pull it down through said slot and deposit the blank on a passing carriage, said slide having its top surface longitudinally grooved.

6. In a jacket forming machine wherein is provided a moving conveyor having at least one unit mounted thereon to travel past a loading station, which unit includes a blank receiving carriage; means located at the loading station for depositing a blank on said carriage, said means which is located at the loading station including a base having a hole shaped to receive stacked blanks, a slide operatively mounted below said hole to sustain the stack of blanks, said slide having a transverse slot, means to move said slide back and forth beneath said hole, the slide when in the forward position exposing the forward edge of the bottom blank of the stack through said slot, and means entering said slot to take hold of the exposed portion of the blank and pull it down through said slot and deposit the blank on a passing carriage, said slide having its top surface longitudinally grooved and the front and back edges at the slot bevelled.

7. In a jacket forming machine wherein is provided a moving conveyor having at least one unit mounted thereon to travel past a loading station, which unit includes a blank receiving carriage; means located at the loading station for depositing a blank on said carriage, said means which is located at the loading station including a base having a hole shaped to receive stacked blanks, a slide operatively mounted below said hole to sustain the stack of blanks, said slide having a transverse slot, means to move said slide back and forth beneath said hole, the slide when in the forward position exposing the forward edge of the bottom blank of the stack through said slot, and means entering said slot to take hold of the exposed portion of the blank and pull it down through said slot and deposit the blank on a passing carriage, said plate also having longitudinal slots extending forwardly from and merging into said transverse slot, and upstanding blank-stack positioning and guiding bars mounted on said base at the margin of the hole in the base, the bars at the front edge of the hole extending down into the longitudinal slots of the slide.

8. In a machine of the class described wherein is provided a horizontally movable conveyor, blank receiving and forming units on said conveyor, each unit including a blank receiving carriage; means for loading the carriages as they pass a particular location in their travel, said means comprising a magazine for holding a stack of flat paper blanks, a support, a horizontally reciprocable frame mounted on said support, a bar vertically slidably mounted on said frame, a suction nozzle bar mounted on said vertically slidable bar for back and forth movement, a suction nozzle on said bar, means to reciprocate said frame, said vertically slidable bar and said nozzle bar in timed relation to raise the nozzle to the magazine to gather a blank and then lower the nozzle and blank into and to travel with a carriage, release the blank and withdraw the nozzle from the carriage.

9. In a machine of the class described wherein is provided a horizontally movable conveyor, blank receiving and forming units on said conveyor, each unit including a blank receiving carriage; means for loading the carriages as they pass a particular location in their travel, said means comprising a magazine for holding a stack of flat paper blanks, a support, a horizontally reciprocable frame mounted on said support, a bar vertically slidably mounted on said frame, a suction nozzle bar mounted on said vertically slidable bar for back and forth movement, a suction nozzle on said bar, means to reciprocate said frame, means to raise and lower said vertically slidable bar while the frame is reciprocated, means to move said nozzle bar in and out while the frame and the vertically slidable bar are operating, all in timed relation to cause said nozzle, while raised and moved in, to gather a blank, then lower the blank and deposit it on a passing carriage and withdraw from the carriage.

10. In a machine of the class described wherein is provided a horizontally movable conveyor, blank receiving and forming units on said conveyor, each unit including a blank receiving carriage, means for loading the carriages as they pass a particular location in their travel, said means comprising a magazine for holding a stack of flat paper blanks, a support, a horizontally reciprocable frame mounted on said support, a bar vertically slidably mounted on said frame, a suction nozzle bar mounted on said vertically slidable bar for back and forth movement, a suction nozzle on said bar, means to reciprocate said frame, means to raise and lower said vertically slidable bar while the frame is being reciprocated, means to move said nozzle bar in and out while the frame and the vertically slidable bar are operating, all in timed relation to cause said nozzle, while raised and moved in, to gather a blank, then lower the blank and deposit it on a passing carriage and withdraw from the carriage, said means to reciprocate said frame comprising a cam shaft, a cam on said shaft to engage said frame and move it in one direction and means for moving the frame in the opposite direction.

11. In a machine of the class described wherein is provided a horizontally movable conveyor, blank receiving and forming units on said conveyor, each unit including a blank receiving carriage; means for loading the carriages as they pass a particular location in their travel, said means comprising a magazine for holding a stack of flat paper blanks, a support, a horizontally reciprocable frame mounted on said support, a bar vertically slidably mounted on said frame, a suction nozzle bar mounted on said vertically slidable bar for back and forth movement, a suction nozzle on said bar, means to reciprocate said frame, means to raise and lower said vertically slidable bar while the frame is being reciprocated, means to move said nozzle bar in and out while the frame and the vertically slidable bar are operating, all in timed relation to cause said nozzle, while raised and moved in, to gather a blank, then lower the blank and deposit it on a passing carriage and withdraw from the carriage, said means to reciprocate said bar comprising a cam shaft, a cam on said shaft, a lever mounted on said support and engaging said cam and a pin and slot type connection between said lever and said bar.

12. In a machine of the class described wherein is provided a horizontally movable conveyor, blank receiving and forming units on said conveyor, each unit including a blank receiving carriage; means for loading the carriages as they pass a particular location in their travel, said means comprising a magazine for holding a stack of flat paper blanks, a support, a horizontally reciprocable frame mounted on said support, a bar vertically slidably mounted on said frame, a suction nozzle bar mounted on said vertically slidable bar for back and forth movement, a suction nozzle on said bar, means to reciprocate said frame, means to raise and lower said vertically slidable bar while the frame is being reciprocated, means to move said nozzle bar in and out while the frame and the vertically slidable bar are operating, all in timed relation to cause said nozzle, while raised and moved in, to gather a blank, then lower the blank and deposit it on a passing carriage and withdraw from the carriage, the means to move said nozzle bar in and out comprising a lever mounted on said bar and stationary cams for engagement by said lever to operate the lever as said frame and said bar are reciprocated in timed relation to one another.

13. In a machine of the class described wherein is provided a horizontally movable conveyor, blank receiving and forming units on said conveyor, each unit including a blank receiving carriage; means for loading the carriages as they pass a particular location in their travel, said means comprising a magazine for holding a stack of flat paper blanks, a support, a horizontally reciprocable frame mounted on said support, a bar vertically slidably mounted on said frame, a suction nozzle bar mounted on said vertically slidable bar for back and forth movement, a suction nozzle on said bar, means to reciprocate said frame, means to raise and lower said vertically slidable bar while the frame is being reciprocated, means to move said nozzle bar in and out while the frame and the vertically slidable bar are operating, all in timed relation to cause said nozzle, while raised and moved in, to gather a blank, then lower the blank and deposit it on a passing carriage and withdraw from the carriage, the means to move said nozzle bar in and out comprising a lever mounted on said bar and stationary cams for engagement by said lever to operate the lever as said frame and said bar are reciprocated in timed relation to one another, one of said stationary cams serving to move the nozzle bar in and the other to move it out, and a safety bar for engagement by said lever to move the nozzle bar out should the said other cam fail to act.

14. In a machine of the class described wherein is provided a horizontally movable conveyor, blank receiving and forming units on said conveyor, each unit including a blank receiving carriage; means for loading the carriages as they pass a particular location in their travel, said means comprising a magazine for holding a stack of flat paper blanks, a support, a horizontally reciprocable frame mounted on said support, a bar vertically slidably mounted on said frame, a suction nozzle bar mounted on said vertically slidable bar for back and forth movement, a suction nozzle on said bar, means to reciprocate said frame, said vertically slidable bar and said nozzle bar being in timed relation to raise the nozzle to the magazine to gather a blank and then lower the nozzle and blank into and to travel with a carriage, release the blank and withdraw the nozzle from the carriage, said magazine comprising a base plate having an opening conforming in outline to that of the blank and through which the blanks pass flatwise, a gate supported under said plate opening on which gate a stack of blanks rests, a rock shaft, a pivoted arm connected to said gate and with said rock shaft to move the gate in and out beneath said plate, said gate having an opening through which blanks may be withdrawn from the stack, and a cam and lever device for rocking said rock shaft.

15. In a jacket forming machine wherein is provided a continuously movable endless conveyor, at least one unit mounted on said conveyor to travel past a loading station, said unit including a blank receiving carriage and a mandrel, means located at the loading station for depositing a blank on said carriage, said means which is located at the loading station comprising means for holding a stack of flat paper blanks, and means to remove a blank from the bottom of the stack and deposit it onto the carriage while the carriage is passing the loading station, said blank depositing means including a magazine for blanks located above the path of travel of the unit's mandrel in the direction of the conveyor travel, and means to withdraw the mandrel from said path while the unit passes the loading station.

16. In a jacket forming machine wherein is provided a continuously movable endless conveyor, at least one unit mounted on said conveyor to travel past a loading station, said unit including a blank receiving carriage and a mandrel, means located at the loading station for depositing a blank on said carriage, said means which is located at the loading station comprising means for holding a stack of flat paper blanks, and means to remove a blank from the bottom of the stack and deposit it onto the carriage while the carriage is passing the loading station, said blank depositing means including a magazine for blanks located above the path of travel of the unit's mandrel in the direction of the conveyor travel, means to withdraw the mandrel from said path while the unit passes the loading station, and a safety bar located below the magazine and in front of the withdrawn mandrel.

17. In a jacket forming machine, a continuously movable endless conveyor; at least one unit mounted on said conveyor to travel past a loading station, a glue applying station and a jacket discharge station; said unit including a blank receiving carriage, a mandrel, blank engaging fingers to wrap the blank around the mandrel and finger operating means; means located at the loading station for depositing a blank on said carriage; means at said glue applying station for applying glue to the blank; means for holding down the blanks in position on the carriage while the carriage is passing the glue applying station; means located between the glue applying station and the discharge station for actuating said finger operating means; and means at the discharge station for removing the finished jacket from the mandrel.

18. In a jacket forming machine, a continuously movable endless conveyor; at least one unit mounted on said conveyor to travel past a loading station, a glue applying station and a jacket discharge station; said unit including a blank receiving carriage, a mandrel, blank engaging fingers to wrap the blank around the mandrel and finger operating means; means located at the loading station for depositing a blank on said carriage; means at said glue applying station for applying glue to the blank; horizontal wires under which the carriage moves while passing the glue applying station to hold the blanks down on the carriage; means to actuate said fingers; and means to discharge the wrappers from the machine.

19. In a jacket forming machine, a continuously movable endless conveyor; at least one unit mounted on said conveyor to travel past a loading station, a glue applying station and a jacket discharge station; said unit including a blank receiving carriage, a mandrel, blank engaging fingers to wrap the blank around the mandrel and finger operating means; means located at the loading station for depositing a blank on said carriage; means at said glue applying station for applying glue to the blank; means located between the glue applying station and the discharge station for actuating said finger operating means; and means at the discharge station for removing the finished jacket from the mandrel, said glue applying means comprising a turret whose axis is located in front of the path of travel of the carriage, a glue pot having glue carrying rollers located in front of the axis of the turret, the turret in part projecting over said path and over said glue pot, at least one dauber device carried by said turret and including a dauber normally held above the plane of the carriage and the roller tops, means for momentarily depressing said dauber to contact said rollers when directly above the same, means for turning the turret to bring the dauber from over the rollers to position over a predetermined portion of the carriage and then bringing the dauber into momentary contact with the blank on the carriage to transfer the glue to the same.

20. In a jacket forming machine, a continuously movable endless conveyor; at least one unit mounted on said conveyor to travel past a loading station, a glue applying station and a jacket discharge station; said unit including a blank receiving carriage, a mandrel, blank engaging fingers to wrap the blank around the mandrel and finger operating means; means located at the loading station for depositing a blank on said carriage; means at said glue applying station for applying glue to the blank; means located between the glue applying station and the discharge station for actuating said finger operating means; and means at the discharge station for removing the finished jacket from the mandrel, said glue applying means comprising a turret whose axis is located in front of the path of travel of the carriage, a glue pot having glue carrying rollers located in front of the axis of the turret, the turret in part projecting over said path and over said glue pot, at least one dauber device carried by said turret and including daubers normally held above the plane of the carriage and the roller tops, means for depressing said dauber to contact said rollers when directly above the same, means for turning the turret to bring the dauber from over the rollers to a position over a predetermined portion of the carriage and then bringing the dauber into contact with the blank on the carriage to transfer the glue to the same.

21. In a jacket forming machine, an endless conveyor; at least one unit mounted on said conveyor to travel past a loading station, a glue applying station and a jacket discharge station; said unit including a blank receiving carriage, a mandrel, blank engaging fingers to wrap the blank around the mandrel and finger operating means; means located at the loading station for depositing a blank on said carriage; means at said glue applying station for applying glue to the blank while the blank is on the carriage; means located between the glue applying station and the discharge station for actuating said finger operating means; means at the discharge station for removing the finished jacket from the mandrel; and means for withdrawing the mandrel from operative position while passing the loading station and the glue applying station.

22. In a jacket forming machine, an endless conveyor; at least one unit mounted on said conveyor to travel past a loading station, a glue applying station and a jacket discharge station; said unit including a blank receiving carriage, a mandrel, blank engaging fingers to wrap the blank around the mandrel, and finger operating means; means located at the loading station for depositing a blank on said carriage; means at said glue applying station for applying glue to the blank; means located between the glue applying station and the discharge station for actuating said finger operating means; and means at the discharge station for removing the finished jacket from the mandrel; and means for wiping the mandrel as it passes on beyond the gluing station and before the blank is wrapped around the mandrel.

23. In a jacket forming machine, an endless conveyor; at least one unit mounted on said conveyor to travel past a loading station, a glue applying station and a jacket discharge station; said unit including a blank receiving carriage, a mandrel, blank engaging fingers to wrap the blank around the mandrel and finger operating means; means located at the loading station for depositing a blank on said carriage; means at said glue applying station for applying glue to the blank; means located between the glue applying station and the discharge station for actuating said finger operating means; means at the discharge station for removing the finished jacket from the mandrel; means for withdrawing the mandrel from operative position while passing the loading station and the glue applying station; and means for wiping the mandrel as it passes on beyond the gluing station and before the blank is wrapped around the mandrel.

24. In a jacket forming machine, an endless conveyor; at least one unit mounted on said conveyor to travel past a loading station, a glue applying station and a jacket discharge station; said unit including a blank receiving carriage, a mandrel, blank engaging fingers to wrap the blank around the mandrel and finger operating means; means located at the loading station for depositing a blank on said carriage; means at said glue applying station for applying glue to the blank; means located between the glue applying station and the discharge station for actuating said finger operating means; means at the discharge station for removing the finished jacket from the mandrel; and means cooperating with the finger which holds the blank seam to impart positive pressure to the seam and cause good adhesion to take place.

25. In a jacket forming machine, an endless conveyor; at least one unit mounted on said conveyor to travel past a loading station, a glue applying station and a jacket discharge station; said unit including a blank receiving carriage, a mandrel, blank engaging fingers to wrap the blank around the mandrel and finger operating means; means located at the loading station for depositing a blank on said carriage; means at said glue applying station for applying glue to the blank; means located between the glue applying station and the discharge station for actuating said finger operating means; means at the discharge station for removing the finished jacket from the mandrel; and means cooperating with the finger which holds the blank seam to impart positive pressure to the seam and cause good adhesion to take place, said last-named means including a yieldable presser device and means for applying said presser device to said finger by virtue of which the presser device when applied to the finger will travel with it during the period of application.

26. In a jacket forming machine, an endless conveyor; at least one unit mounted on said conveyor to travel past a loading station, a glue applying station and a jacket discharge station; said unit including a blank receiving carriage, a mandrel, blank engaging fingers to wrap the blank around the mandrel and finger operating means; means located at the loading station for depositing a blank on said carriage; means at said glue applying station for applying glue to the blank; means located between the glue applying station and the discharge station for actuating said finger operating means; means at the discharge station for removing the finished jacket from the mandrel; and means cooperating with the finger which holds the blank seam to impart positive pressure to the seam and cause good adhesion to take place, said last-named means comprising a presser arm, a lever on which said arm is pivotally mounted, spring means continuously urging said arm to move in a direction opposite the direction of travel of the carriage, and cam means operating said lever at a predetermined time to cause said presser arm to engage the finger with which it cooperates.

27. In a jacket forming machine wherein is provided an endless conveyor on which is mounted a mandrel which is carried past a discharge station: the improvement which comprises means at the discharge station for removing the finished jacket from the mandrel, said means at the discharge station comprising a swinging arm, a rotatable disc carried by said arm, means continuously urging said arm in one direction to hold said disc clear of the passing mandrel, means to effect rotation of said disc, means to swing said arm over a passing mandrel and bring said disc in throw-off contact with the jacket on said mandrel, and a receiver into which said jacket is thrown, a nesting trough lined up with said receiver, and means to prevent a jacket from being thrown beyond the receiver into said trough and for pushing nested jackets along said trough and pushing the jacket from the receiver into the trough.

28. In a machine of the character described, a jacket forming unit comprising a base plate, a main standard mounted thereon and having a bore, a sleeve in said bore, a mandrel having a head which is located in said sleeve, a shaft secured to said mandrel and passing through said sleeve beyond the rear end of the same, an auxiliary standard having a hole in which said shaft is longitudinally slidable, means holding said shaft and mandrel against turning, a pair of sleeves rotatably carried on said first mentioned sleeve, a finger bar carried by each sleeve of the pair and having means to cooperate with said mandrel to form the jacket, means to rotate said pair of sleeves to move the finger bars about the mandrel, means when said finger bars are in one position to hold them away from the mandrel, and means for bringing a paper blank into engagement with the mandrel before the finger bars operate.

29. In a machine of the character described, a jacket forming unit comprising a base plate, a main standard mounted thereon and having a bore, a sleeve in said bore, a mandrel having a head which is located in said sleeve, a shaft secured to said mandrel and passing through said sleeve beyond the rear end of the same, an auxiliary standard having a hole in which said shaft is longitudinally slidable, means holding said shaft and mandrel against turning, a pair of sleeves rotatably carried on said first mentioned sleeve, a finger bar carried by each sleeve of the pair and having means to cooperate with said mandrel to form the jacket, means to rotate said pair of sleeves to move the finger bars about the mandrel, means when said finger bars are in one position to hold them away from the mandrel, means for bringing a paper blank into engagement with the mandrel before the finger bars operate, and a yieldable latch device for holding the mandrel in its operative position.

30. In a machine of the character described, a jacket forming unit comprising a base plate, a main standard mounted thereon and having a bore, a sleeve in said bore, a mandrel having a head which is located in said sleeve, a shaft secured to said mandrel and passing through said sleeve beyond the rear end of the same, an auxiliary standard having a hole in which said shaft is longitudinally slidable, means holding said shaft and mandrel against turning, a pair of sleeves rotatably carried on said first mentioned sleeve, a finger bar carried by each sleeve of the pair and having means to cooperate with said mandrel to form the jacket, means to rotate said pair of sleeves to move the finger bars about the mandrel, means when said finger bars are in one position to hold them away from the mandrel, means for bringing a paper blank into engagement with the mandrel before the finger bars operate, a blank receiving carriage located beneath the mandrel and normally spaced therefrom, means on said carriage for receiving a blank and holding it in a predetermined position on the carriage, and means for moving said carriage toward the mandrel to bring the blank into contact with the mandrel.

31. In a machine of the character described, a jacket forming unit comprising a base plate, a main standard mounted thereon and having a bore, a sleeve in said bore, a mandrel having a head which is located in said sleeve, a shaft secured to said mandrel and passing through said sleeve beyond the rear end of the same, an auxiliary standard having a hole in which said shaft is longitudinally slidable, means holding said shaft and mandrel against turning, a pair of sleeves rotatably carried on said first mentioned sleeve, a finger bar carried by each sleeve of the pair and having means to cooperate with said mandrel to form the jacket, means to rotate said pair of sleeves to move the finger bars about the mandrel, means when said finger bars are in one position to hold them away from the mandrel, means for bringing a paper blank into engagement with the mandrel before the finger bars operate, a blank receiving carriage located beneath the mandrel and normally spaced therefrom, means on said carriage for receiving a blank and holding it in a predetermined position on the carriage, means for moving said carriage toward the mandrel to bring the blank into contact with the mandrel, and means to ensure parallelism between the surface of the mandrel and that of the blank at the instant of contact of the blank with the mandrel.

32. In a machine of the character stated, a jacket forming unit which includes a base, a standard mounted on the base, a mandrel mounted in the standard, a blank receiving carriage located beneath and normally spaced from the mandrel, a lever to which said carriage is pivoted, means to lock the lever with the carriage on the base, means operating upon unlocking the lever for moving the carriage toward the mandrel to bring the blank against the mandrel, and fingers carried by said standard and operative to wrap the blank around the mandrel.

33. In a machine of the character stated, a jacket forming unit which includes a base, a standard mounted on the base, a mandrel mounted in the standard, a blank receiving carriage located beneath and normally spaced from the mandrel, a lever to which said carriage is pivoted, means to lock the lever with the carriage on the base, means operating upon unlocking the lever for moving the carriage toward the mandrel to bring the blank against the mandrel, and fingers carried by said standard and operative to wrap the blank around the mandrel, said carriage comprising a body having upstanding sides the tops of which are flanged to form blank rests, blank positioning means on said tops, a support located between said sides, and a body carried by said support for effecting line contact with said mandrel.

34. In a machine of the character stated, a jacket forming unit which includes a base, a standard mounted on the base, a mandrel mounted in the standard, a blank receiving carriage located beneath and normally spaced from the mandrel, a lever to which said carriage is pivoted, means to lock the lever with the carriage on the base, means operating upon the lever for moving the carriage toward the mandrel to bring the blank against the mandrel, and fingers carried by said standard and operative to wrap the blank around the mandrel, said carriage comprising a body having upstanding sides the tops of which are flanged to form blank rests, blank positioning means on said tops, a support located between said sides, a body carried by said support for effecting line contact with said mandrel, said carriage being overbalanced toward its rear, and means for adjusting the movement of said carriage on its pivot so that the lever will move said carriage toward said mandrel and effect bodily a line contact between the blank and the under side of the mandrel.

35. In a machine of the character stated, a jacket forming unit which includes a base, a standard mounted on the base, a mandrel mounted in the standard, a blank receiving carriage located beneath and normally spaced from the mandrel, a lever to which said carriage is pivoted, means to lock the lever with the carriage on the base, means operating upon unlocking the lever for moving the carriage toward the mandrel to bring the blank against the mandrel, and fingers carried by said standard and operative to wrap the blank around the mandrel, said carriage comprising a body having upstanding sides the tops of which are flanged to form blank rests, blank positioning means on said tops, a support located between said sides, a body carried by said support for effecting line contact with said mandrel, said carriage being overbalanced toward its rear, and means for adjusting the movement of said carriage on its pivot so that the lever will move said carriage toward said mandrel and effect bodily a line contact between the blank and the under side of the mandrel, said second mentioned body comprising a cylinder and said adjusting means comprising an adjusting screw carried by said cylinder and engaging said lever.

36. In a machine of the character stated, a jacket forming unit comprising a base, a standard mounted on said base and having a bore, a mandrel receiving sleeve mounted in said bore and projecting in front of said standard, the projecting end of the sleeve having a collar, a pair of nested gear sleeves rotatably mounted on said mandrel receiving sleeve, rack bars mounted to reciprocate in slideways in said standard and engage with the gear portions of the respective sleeves, means on said rack bars by which they may be reciprocated, said gear sleeves having portions projecting forwardly to said collar, finger bars pivotally mounted on said portions, a mandrel mounted in said mandrel receiving sleeve and projecting forwardly of the collar end of the sleeve for cooperation with said finger bars in shaping the blank, said finger bars carrying paper pressers for holding the blank against the mandrel, means operating continuously on said finger bars to tend to press said pressers to the mandrel, stationary cams on said standard and cam engaging lugs on said finger bars for holding said pressers out of operative position when the finger bars are in one position, a paper blank carriage located beneath the mandrel and having spaces in which said finger bars lie when inoperative, said carriage normally lying clear of the mandrel, and means for moving the carriage up to the mandrel to place a blank in contact with the mandrel in position to be acted on by said finger bars and their pressers.

37. In a machine of the character stated, a jacket forming unit comprising a base, a standard mounted on said base and having a bore, a mandrel receiving sleeve mounted in said bore and projecting in front of said standard, the projecting end of the sleeve having a collar, a pair of nested gear sleeves rotatably mounted on said mandrel receiving sleeve, rack bars mounted to reciprocate in slideways in said standard and engage with the gear portion of the respective sleeves, means on said rack bars by which they may be reciprocated, said gear sleeves having portions projecting forwardly to said collar, finger bars pivotally mounted on said portions, a mandrel mounted in said mandrel receiving sleeve and projecting forwardly of the collar end of the sleeve for cooperation with said finger bars in shaping the blank, said finger bars carrying paper pressers for holding the blank against the mandrel, means operating continuously on said finger bars to tend to press said pressers to the mandrel, stationary cams on said standard and cam engaging lugs on said finger bars for holding said pressers out of operative position when the finger bars are in one position, a paper blank carriage located beneath the mandrel and having spaces in which said finger bars lie when inoperative, said carriage normally lying clear of the mandrel, means for moving the carriage up to the mandrel to place a blank in contact with the mandrel in position to be acted on by said finger bars and their pressers, and rack bar stroke-adjusting means on said standard by which they may be adjusted so that one bar has a lesser stroke than the other in order that the finger bar pressers may lap the blank for gluing purposes.

38. In a machine of the character stated, a jacket forming unit comprising a base, a standard mounted on said base and having a bore, a mandrel receiving sleeve mounted in said bore and projecting in front of said standard, the projecting end of the sleeve having a collar, a pair of nested gear sleeves rotatably mounted on said mandrel receiving sleeve, rack bars mounted to reciprocate in slideways in said standard and engage with the gear portions of the respective sleeves, means on said rack bars by which they may be reciprocated, said gear sleeves having portions projecting forwardly to said collar, finger bars pivotally mounted on said portions, a mandrel mounted in said mandrel receiving sleeve and projecting forwardly of the collar end of the sleeve for cooperation with said finger bars in shaping the blank, said finger bars carrying paper pressers for holding the blank against the mandrel, means operating continuously on said finger bars to tend to press said pressers to the mandrel, stationary cams on said standard and cam engaging lugs on said finger bars for holding said pressers out of operative position when the finger bars are in one position, a paper blank carriage located beneath the mandrel and having spaces in which said finger bars lie when inoperative, said carriage normally lying clear of the mandrel, means for moving the carriage up to the mandrel to place a blank in contact with the mandrel in position to be acted on by said finger bars and their pressers, and rack bar stroke-adjusting means for adjusting the range of action of the finger bars in effecting the wrapping of the blank around the mandrel so that the sides of the blank will be lapped at the top of the mandrel and pressed down together by one of the pressers, the mandrel having a flat top portion against which the pressure is applied.

39. In a machine of the character stated, a jacket forming unit comprising a base, a standard mounted on said base and having a bore, a mandrel receiving sleeve mounted in said bore and projecting in front of said standard, the projecting end of the sleeve having a collar, a pair of nested gear sleeves rotatably mounted on said mandrel receiving sleeve, rack bars mounted to reciprocate in slideways in said standard and engage with the gear portions of the respective sleeves, means on said rack bars by which they may be reciprocated, said gear sleeves having portions projecting forwardly to said collar, finger bars pivotally mounted on said portions, a mandrel mounted in said mandrel receiving sleeve and projecting forwardly of the collar end of the sleeve for cooperation with said finger bars in shaping the blank, said finger bars carrying paper pressers for holding the blank against the mandrel, means operating continuously on said finger bars to tend to press said pressers to the mandrel, stationary cams on said standard and cam engaging lugs on said finger bars for holding said pressers out of operative position when the finger bars are in one position, a paper blank carriage located beneath the mandrel and having spaces in which said finger bars lie when inoperative, said carriage normally lying clear of the mandrel, means for moving the carriage up to the mandrel to place a blank in contact with the mandrel in position to be acted on by said finger bars and their pressers, and rack bar stroke-adjusting means for adjusting the range of action of the finger bars in effecting the wrapping of the blank around the mandrel so that the sides of the blank will be lapped at the top of the mandrel and pressed down together by one of the pressers, the mandrel having a flat top portion against which the pressure is applied, the other presser having a bevelled face whereby it will enter the lap part way, while the pressure is being applied by the first presser, and prevent the edge of the top lap of the blank from adhesion to the blank portion below the same.

40. In a machine of the class described wherein is provided an endless conveyor having thereon blank-receiving carriages, the improvement which comprises: means for loading the carriages while they are passing a predetermined place in their travel, said means comprising a magazine for holding a stack of flat paper blanks, a support, a reciprocable frame mounted on said support, a bar slidably mounted on said frame for movement in a direction at right angles to that of said frame, a suction nozzle bar mounted on said slidable bar for movement back and forth in a direction at right angles to said slidable bar, a suction nozzle carried by said suction nozzle bar, and means to reciprocate said frame, said slidable bar and said suction nozzle bar in timed relation to move the suction nozzle to the magazine to gather a blank and then move the suction nozzle and the blank into and to travel with a carriage, release the blank and withdraw the nozzle from the carriage.

41. In a machine of the character described, a jacket forming unit comprising a base, a standard mounted thereon and having a bore, a sleeve in said bore, a mandrel having a head which is located in said sleeve, a shaft secured to said mandrel, means holding said shaft and mandrel against turning, a pair of sleeves rotatably carried on said first mentioned sleeve, a finger bar carried by each sleeve of the pair and having means to cooperate with said mandrel to form the jacket, means to rotate said pair of sleeves to move the finger bars about the mandrel, means when said finger bars are in one position to hold them away from the mandrel, and means for bringing a paper blank into engagement with the mandrel before the finger bars operate.

42. In a machine of the character described, a jacket forming unit comprising a base, a standard mounted thereon and having a bore, a sleeve in said bore, a mandrel having a head which is located in said sleeve, a shaft secured to said mandrel, means holding said shaft and mandrel against turning, a pair of sleeves rotatably carried on said first mentioned sleeve, a finger bar carried by each sleeve of the pair and having means to cooperate with said mandrel to form the jacket, means to rotate said pair of sleeves to move the finger bars about the mandrel, means when said finger bars are in one position to hold them away from the mandrel, means for bringing a paper blank into engagement with the mandrel before the finger bars operate, and yieldable means for holding the mandrel in its operative position.

43. In a machine of the character described, a jacket forming unit comprising a base, a standard mounted thereon and having a bore, a sleeve in said bore, a mandrel having a head which is located in said sleeve, a shaft secured to said mandrel, means holding said shaft and mandrel against turning, a pair of sleeves rotatably carried on said first mentioned sleeve, a finger bar carried by each sleeve of the pair and having means to cooperate with said mandrel to form the jacket, means to rotate said pair of sleeves to move the finger bars about the mandrel, means when said finger bars are in one position to hold them away from the mandrel, means for bringing a paper blank into engagement with the mandrel before the finger bars operate, a blank receiving carriage located beneath the mandrel and normally spaced therefrom, means on said carriage for receiving a blank and holding it in position on the carriage, and means for moving said carriage toward the mandrel to bring the blank into contact with the mandrel.

44. In a machine of the character described, a jacket forming unit comprising a base, a standard mounted thereon and having a bore, a sleeve in said bore, a mandrel having a head which is located in said sleeve, a shaft secured to said mandrel, means holding said shaft and mandrel against turning, a pair of sleeves rotatably carried on said first mentioned sleeve, a finger bar carried by each sleeve of the pair and having means to cooperate with said mandrel to form the jacket, means to rotate said pair of sleeves to move the finger bars about the mandrel, means when said finger bars are in one position to hold them away from the mandrel, means for bringing a paper blank into engagement with the mandrel before the finger bars operate, a blank receiving carriage located beneath the mandrel and normally spaced therefrom, means on said carriage for receiving a blank and holding it in position on the carriage, means for moving said carriage toward the mandrel to bring the blank into contact with the mandrel, and means to ensure parallelism between the surface of the mandrel and that of the blank at the instant of contact of the blank with the mandrel.

45. In a jacket forming machine, an endless conveyor; at least one unit mounted on said conveyor to travel past a loading station, a glue applying station and a jacket discharge station; said unit including a blank receiving carriage, a mandrel, blank engaging fingers to wrap the blank around the mandrel and finger operating means; means located at the loading station for depositing a blank on said carriage; means at said glue applying station for applying glue to the blank while the blank is on the carriage; means for holding the blank down on the carriage while it is passing the glue applying station; means located between the glue applying station and the discharge station for actuating said finger operating means; means at the discharge station for removing the finished jacket from the mandrel; and means for withdrawing the mandrel from operative position while passing the loading station and the glue applying station.

46. In a jacket forming machine, an endless travelling conveyor, blank carriages on said conveyor, a glue applying device located at one station adjacent the path of travel of the conveyor and including at least one dauber for daubing glue on the blanks as they pass that station, and means at that station for holding the blanks down on the passing carriages while the dauber is in operation so as to prevent adhesion of the blanks to the dauber, and means on the carriage for holding the blanks against being slipped off the carriages as the carriages pass beneath the means that holds the blanks down on the carriages while they are passing the said one station.

47. In a jacket forming machine, an endless travelling conveyor, blank carriages on said conveyor, a glue applying device located at one station adjacent the path of travel of the conveyor and including at least one dauber for daubing glue on the blanks as they pass that station, and means at that station for holding the blanks down on the passing carriages while the dauber is in operation so as to prevent adhesion of the blanks to the dauber, said means comprising tension wires under which the blanks are carried and over and between which the dauber operates, and means on the carriage for holding the blanks against being slipped off the carriages as the carriages pass beneath the means that holds the blanks down on the carriages while they are passing the said one station.

48. In a machine of the class described wherein is provided an endless conveyor having thereon a set of blank receiving and forming units that include blank receiving carriages: the improvement which comprises a magazine for holding a stack of flat blanks, a support, a reciprocable frame on said support, a bar slidably mounted on said frame for movement in a direction at right angles to that of said frame, a suction nozzle bar mounted on said slidable bar for movement back and forth in a direction at right angles to said slidable bar, a suction nozzle carried by said suction nozzle bar, and means to reciprocate said frame, said slidable bar and said suction nozzle bar in timed relation to move the suction nozzle to the magazine to gather a blank and then move the suction nozzle and the blank into and to travel with the carriage, release the blank and withdraw the nozzle from the carriage.

JAMES BALTON.